US008831655B2

(12) United States Patent
Burchill et al.

(10) Patent No.: US 8,831,655 B2
(45) Date of Patent: Sep. 9, 2014

(54) METHODS AND APPARATUS FOR COEXISTENCE OF WIRELESS SUBSYSTEMS IN A WIRELESS COMMUNICATION DEVICE

(71) Applicant: Apple Inc., Cupertino, CA (US)

(72) Inventors: William S. Burchill, San Jose, CA (US); Paul V. Flynn, Menlo Park, CA (US); Vinay R. Majjigi, Sunnyvale, CA (US); Xiaowen Wang, Cupertino, CA (US); Kee-Bong Song, San Diego, CA (US); Syed A. Mujtaba, Santa Clara, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/969,268

(22) Filed: Aug. 16, 2013

(65) Prior Publication Data
US 2013/0331137 A1 Dec. 12, 2013

Related U.S. Application Data

(63) Continuation-in-part of application No. 13/910,471, filed on Jun. 5, 2013.

(60) Provisional application No. 61/655,994, filed on Jun. 5, 2012, provisional application No. 61/684,115, filed on Aug. 16, 2012.

(51) Int. Cl.
H04B 15/00 (2006.01)
H04W 52/24 (2009.01)
H04W 88/06 (2009.01)
H04W 72/08 (2009.01)

(52) U.S. Cl.
CPC .......... H04W 52/243 (2013.01); H04W 72/082 (2013.01); H04W 88/06 (2013.01); H04B 15/00 (2013.01)
USPC ...................... 455/501; 455/552.1; 455/550.1; 455/553.1; 455/67.11; 455/434; 370/310; 370/328; 370/329; 370/338; 370/343

(58) Field of Classification Search
CPC ... H04W 88/06; H04W 16/14; H04W 72/082; H04W 72/085; H04W 24/10
USPC ............. 455/501, 552.1, 550.1, 553.1, 67.11, 455/445, 434, 422.1, 403, 466, 426.1, 455/426.2, 423–425, 500, 517; 370/310, 370/328, 329, 338, 343, 254
See application file for complete search history.

(56) References Cited

U.S. PATENT DOCUMENTS 7,966,037 B2  6/2011 Rayzman et al.
8,095,176 B2  1/2012 Sudak
(Continued)

FOREIGN PATENT DOCUMENTS

WO  2011014360 A2  2/2011
WO  2011106159 A2  9/2011
(Continued)

OTHER PUBLICATIONS

International Search Report and Written Opinion in PCT Application PCT/US2013/055269, dated Oct. 30, 2013.

Primary Examiner — Keith Ferguson
(74) Attorney, Agent, or Firm — Womble Carlyle Sandridge & Rice LLP

(57) ABSTRACT

Methods and apparatus to mitigate interference among multiple wireless subsystems of a wireless communication device are described. A host processor obtains configurations for a plurality of wireless subsystems and evaluates whether potential or actual coexistence interference exists between two or more of the wireless subsystems. The host processor provides configuration information and link quality reporting parameters to and obtains link quality reports from at least two wireless subsystems. When link quality for at least one wireless subsystem fails a set of link quality conditions, the host processor adjusts data requirements for applications that communicate through one or more of the wireless subsystems and/or adjusts radio frequency operating conditions for one or more of the wireless subsystems to mitigate interference among the wireless subsystems.

20 Claims, 20 Drawing Sheets

(56) References Cited

U.S. PATENT DOCUMENTS

| | | |
|---|---|---|
| 8,160,001 B2 | 4/2012 | Bitran |
| 8,165,153 B2 | 4/2012 | Kaidar et al. |
| 8,417,187 B2 | 4/2013 | Chen et al. |
| 2008/0051085 A1 | 2/2008 | Ganton |
| 2010/0304685 A1 | 12/2010 | Wietfeldt et al. |
| 2010/0330977 A1 | 12/2010 | Kadous et al. |
| 2011/0026432 A1 | 2/2011 | Gruber et al. |
| 2011/0205986 A1 | 8/2011 | Medapalli |
| 2011/0312288 A1 * | 12/2011 | Fu et al. ............. 455/88 |
| 2012/0155303 A1 | 6/2012 | Kuo |
| 2012/0176923 A1 | 7/2012 | Hsu et al. |
| 2012/0195298 A1 | 8/2012 | Kuo |
| 2012/0213150 A1 | 8/2012 | Oguz et al. |
| 2012/0281563 A1 * | 11/2012 | Comsa et al. ............. 370/252 |

FOREIGN PATENT DOCUMENTS

| | | |
|---|---|---|
| WO | 2012177622 A1 | 12/2012 |
| WO | 2013048571 A1 | 4/2013 |

\* cited by examiner

Host Coexistence: Initialization

| Event | Host Messages to WiFi-BT | Host Messages to Cellular |
|---|---|---|
| Specific Combination of Cellular and WiFi-BT Configuration Cause Coexistence Problem | • Enter WiFi-BT Coexistence State<br>• Provide Cellular Configuration (Band, Channel, Bandwidth)<br>• Provide TDD Configuration (UL/DL, Special Subframe Format)<br>• Provide RT Interface Calibration Parameters (Offset, Jitter)<br>• Configure Parameters for WiFi and BT Link Quality Metric Reporting<br>• Provide BT AFH Mask (Based on Cellular Configuration) | • Enter Cellular Coexistence State<br>• Configure Cellular Coexistence Parameters (Thresholds, TX Power Limits)<br>• Provide RT Interface Calibration Parameters (Offset, Jitter)<br>• Configure Parameters for Cellular Link Quality Metric Reporting |

FIG. 13

Host Coexistence: Cellular (Aggressor) and WiFi-BT (Victim)

| Event | Host Actions |
|---|---|
| WiFi-BT Link Quality Fails A Set Of Link Quality Conditions | • Adjust Data Requirements For 1+ Applications (Reduce Real Time Codec Rates, Reduce Streaming Transfer Rates, etc.)<br>• Reduce Cellular UL Data Traffic<br>• Request Cellular Reduce UL Transmissions (Rate, Time, Resource Requests, etc.)<br>• Request Cellular Reduce UL Transmit Power<br>• Configure Periodic Link Quality Metric Reporting |
| Cellular Link Quality Report | • Adjust Cellular Transmit Power If Cellular Uplink Quality Changes |
| Cellular Limits UL Transmit Power | • Configure Periodic Link Quality Metric Reporting |
| Cellular Does Not Limit UL Transmit Power In Response To Request | • Adjust Data Requirements For 1+ Applications (Reduce Real Time Codec Rates, Reduce Streaming Transfer Rates, etc.)<br>• Reduce Cellular UL Data Traffic<br>• Request Cellular Reduce UL Transmissions (Rate, Time, Resource Requests, etc.) |
| Specific Combination of Cellular and WiFi-BT Configurations Does Not Cause Coexistence Problem | • Disable Cellular Coexistence State<br>• Disable WiFi-BT Coexistence State |

Host Coexistence: WiFi-BT (Aggressor) and Cellular (Victim)

| Event | Host Actions |
|---|---|
| Cellular Link Quality Fails A Set Of Link Quality Conditions | • Adjust Data Requirements For 1+ Applications (Reduce Real Time Codec Rates, Reduce Streaming Transfer Rates, etc.)<br>• Request WiFi-BT Reduce Transmit Power<br>• Request BT Use New AFH Mask<br>• Request WiFi To Change Frequency Channel When In P2P Or AP Mode<br>• Configure Periodic Link Quality Metric Reporting |
| WiFi-BT Link Quality Report | • Adjust WiFi-BT Transmit Power If WiFi-BT Link Quality Changes |
| WiFi-BT Limits Transmit Power | • Configure Periodic Link Quality Metric Reporting |
| WiFi-BT Does Not Limit Transmit Power In Response To Request | • Adjust Data Requirements For 1+ Applications (Reduce Real Time Codec Rates, Reduce Streaming Transfer Rates, etc.)<br>• Reduce WiFi-BT Data Traffic |
| WiFi Mode Changes From Station To P2P Or AP | • Request WiFi To Change Frequency Channel |
| BT Role Changes From Slave To Master | • Request BT Adjust Timing To Align With TDD Cellular Frames |
| Specific Combination of Cellular and WiFi-BT Configurations Does Not Cause Coexistence Problem | • Disable Cellular Coexistence State<br>• Disable WiFi-BT Coexistence State |

FIG. 15

Cellular Coexistence: Cellular (Aggressor) and WiFi-BT (Victim)

| Event | Cellular Actions |
|---|---|
| Cellular RF Configuration (RAT, Frequency, TDD Frame) Change | • Provide RF Configuration Change To Host |
| Host Enables Cellular Coexistence State | • Obtain Coexistence Configuration Parameters From Host<br>• Configure Link Quality Reporting<br>• Calibrate RT Interface To WiFi-BT<br>• Account For "Rx Priority" Signal From WiFi-BT |
| Host Or WiFi-BT Provides Coexistence Request (Limit Data, Tx Power, Start/Stop Link Quality Reporting, etc.) | • Some Actions Conditioned On Cellular Link State (Link Quality, Number of Radio Bearers, Active Procedures)<br>• Adjust Tx Rate, Tx Power<br>• Delay And/Or Reduce Cellular UL Data Resource Requests (BSR, SR)<br>• Calculate And Report Cellular Link Quality Metrics |
| Cellular State (RRC, Tx/Rx, Activity) Change | • Provide Cellular State And/Or Cellular Activity Messages To WiFi-BT<br>• Provide Cellular Tx Information To WiFi-BT |
| Host Disables Cellular Coexistence State | • Reconfigure Link Quality Reporting |

FIG. 16

Cellular Coexistence: WiFi-BT (Aggressor) and Cellular (Victim)

| Event | Cellular Actions |
|---|---|
| Cellular RF Configuration (RAT, Frequency, TDD Frame) Change | • Provide RF Configuration Change To Host |
| Host Enables Cellular Coexistence State | • Obtain Coexistence Configuration Parameters From Host<br>• Configure Link Quality Reporting<br>• Calibrate RT Interface To WiFi-BT |
| Host Or WiFi-BT Provides Coexistence Request (Delay Rx, Adjust CQI, Start/Stop Or Reconfigure Link Quality Reporting, etc.) | • Some Actions Conditioned On Cellular Link State (Link Quality, Active Procedures)<br>• Delay Cellular DL Transmissions (Data, Non-Critical Signaling Messages)<br>• Send Adjusted CQI Report To Base Station<br>• Calculate And Report Cellular Link Quality Metrics |
| Cellular State Change (Activity, Procedure, Link Quality) | • Provide Cellular State And/Or Cellular Activity Messages To WiFi-BT And/Or Host<br>• Request WiFi Or BT Limit Tx Time And/Or Power<br>• Request WiFi Or BT Tx Information<br>• Provide Link Quality Information |
| Host Disables Cellular Coexistence State | • Reconfigure Link Quality Reporting |

FIG. 17

1800 → WiFi-BT Coexistence: Cellular (Aggressor) and WiFi-BT (Victim)

| Event | WiFi-BT Actions |
|---|---|
| WiFi-BT Configuration (WiFi Channel/Mode, BT Role/Profile) Change | • Provide WiFi-BT Configuration Change To Host |
| Host Enables WiFi-BT Coexistence State | • Obtain Cellular Configuration Parameters (Band, Channel, Bandwidth, TDD UL/DL) From Host<br>• Configure Link Quality Reporting<br>• Calibrate RT Interface To Cellular<br>• Obtain BT AFH Mask From Host |
| Host Or Cellular Provides Coexistence Request (Cellular State, Activity, Tx Information, Start/Stop Link Quality Reporting, etc.) | • Some Actions Conditioned on WiFi-BT Critical State or Activity<br>• Adjust BT Timing<br>• Reconfigure BT AFH<br>• Schedule BT Rx For Asynchronous Links<br>• Provide Indication To WiFi Access Point To Schedule WiFi Rx<br>• Change WiFi Frequency Channel (For AP or P2P Modes)<br>• Calculate And Report Link Quality Metrics To Host |
| WiFi-BT State Change (Critical BT or WiFi Activity, BT or WiFi Link Quality) | • Provide WiFi/BT State And/Or Activity Messages To Cellular<br>• Request Cellular Limit Tx Adjustments (Timing, Frequency, Power, etc.)<br>• Report Link Quality Metrics To Host |
| Host Disables WiFi-BT Coexistence State | • Reconfigure Link Quality Reporting |

FIG. 18

WiFi-BT Coexistence: WiFi-BT (Aggressor) and Cellular (Victim)

| Event | WiFi-BT Actions |
|---|---|
| WiFi-BT Configuration (WiFi Channel/Mode, BT Role/Profile) Change | • Provide WiFi-BT Configuration Change To Host |
| Host Enables WiFi-BT Coexistence State | • Obtain Cellular Configuration Parameters (Band, Channel, Bandwidth, TDD UL/DL) From Host<br>• Configure Link Quality Reporting<br>• Calibrate RT Interface To Cellular<br>• Obtain BT AFH Mask From Host |
| Host Or Cellular Provides Coexistence Request (Cellular State/Activity, Limit/Adjust WiFi and/or BT Tx, etc.) | • Some Actions Conditioned on WiFi-BT Critical State or Activity<br>• Adjust BT Timing<br>• Reconfigure BT AFH<br>• Schedule BT Tx For Asynchronous Links<br>• Deny BT Tx For Synchronous Links<br>• Delay WiFi Tx<br>• Limit WiFi Power And/Or BT Tx Power (Conditional)<br>• Change WiFi Frequency Channel (For AP or P2P Modes)<br>• Calculate And Report Link Quality Metrics To Host |
| WiFi-BT State Change (BT or WiFi Tx/Rx State, WiFi or BT Link Quality) | • Provide WiFi/BT State And/Or Activity Messages To Cellular<br>• Request Cellular Limit Delay Reception<br>• Report Link Quality Metrics To Host |
| Host Disables WiFi-BT Coexistence State | • Reconfigure Link Quality Reporting |

FIG. 19

METHODS AND APPARATUS FOR COEXISTENCE OF WIRELESS SUBSYSTEMS IN A WIRELESS COMMUNICATION DEVICE

CROSS-REFERENCE TO RELATED APPLICATIONS

This application is a continuation-in-part of U.S. patent application Ser. No. 13/910,471, filed on Jun. 5, 2013, which claims the benefit of U.S. Provisional Patent Application No. 61/655,994, filed on Jun. 5, 2012, which are both incorporated by reference herein in their entireties for all purposes. This application claims the benefit of U.S. Provisional Patent Application No. 61/684,115, filed on Aug. 16, 2012, which is incorporated by reference herein in its entirety for all purposes.

FIELD OF THE DESCRIBED EMBODIMENTS

The described embodiments relate generally to wireless communications and more particularly to facilitating in-device coexistence between wireless subsystems in a wireless communication device.

BACKGROUND

Many modern wireless communication devices include multiple wireless subsystems, which may also be referred to as radios herein. The multiple radios may be used by a wireless communication device to communicate concurrently via multiple wireless communication technologies. In many instances, wireless communication technologies used by a device use channel bands that may interfere with each other. In such instances, energy from a band used by one technology can leak into a band used by another technology. This energy leakage can raise the noise floor and cause a problem known as "de-sense." In many instances, de-sense can negatively impact the use of certain channel bands and, in severe cases, can render certain channel bands unusable. Accordingly, interference that can result in de-sense poses a problem for in-device coexistence of multiple radios using disparate wireless communication technologies.

A particularly troublesome de-sense problem can result in a scenario in which a one radio emits a transmission via a first wireless communication technology, referred to as an aggressor wireless communication technology, or aggressor technology, while another radio receives data via a second wireless communication technology, referred to as a victim wireless communication technology, or victim technology. Data reception via the victim technology can be damaged by the aggressor transmission, particularly in instances in which the radio using the aggressor technology uses a relatively high transmission power. In this regard, received packet errors, or even complete deafening of the radio using the victim technology receiver can result from interference that can be caused by the aggressor technology transmission. For example transmission of a cellular signal by a first radio on a device at a time when a Bluetooth (BT) or wireless local area network (WLAN) signal is received by a second radio on the device can deafen the second radio, causing errors and, in some cases, loss of connection.

SUMMARY OF THE DESCRIBED EMBODIMENTS

Methods and apparatus to mitigate interference among multiple wireless subsystems of a wireless communication device are described. A host processor obtains configurations for a plurality of wireless subsystems and evaluates whether potential or actual coexistence interference exists between two or more of the wireless subsystems. The host processor provides configuration information and link quality reporting parameters to and obtains link quality reports from at least two wireless subsystems. When link quality for at least one wireless subsystem fails a set of link quality conditions, the host processor adjusts data requirements for applications that communicate through one or more of the wireless subsystems and/or adjusts radio frequency operating conditions for one or more of the wireless subsystems to mitigate interference among the wireless subsystems.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

FIG. 13 illustrates a table summarizing a set of messages that the host processor can send to two different wireless subsystems of the wireless communication device when transitioning from a "no wireless coexistence" state to a "wireless coexistence" state 1204, in accordance with some embodiments.

FIGS. 14 and 15 illustrate tables that summarize a set of actions that the host processor can undertake to mitigate interference between wireless subsystems of the wireless communication device, in accordance with some embodiments.

FIGS. 16 and 17 illustrate tables that summarize actions that a cellular wireless subsystem of the wireless communication device can undertake based on one or more events to mitigate interference between wireless subsystems in the wireless communication device, in accordance with some embodiments.

FIGS. 18 and 19 illustrate tables that summarize actions that a WiFi-BT wireless subsystem of the wireless communication device can undertake based on one or more events to mitigate interference between wireless subsystems in the wireless communication device, in accordance with some embodiments.

DETAILED DESCRIPTION OF SELECTED EMBODIMENTS

Figure 1:
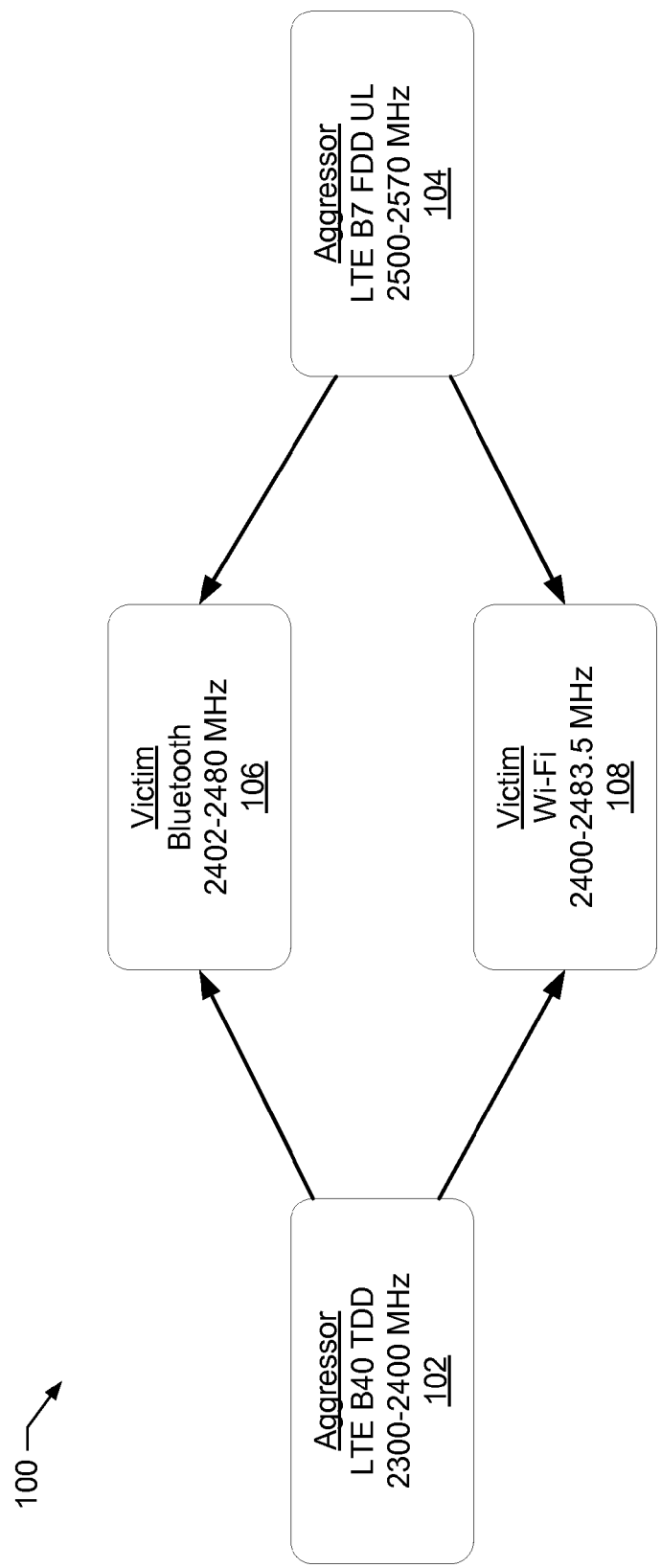
FIG. 1 illustrates an example of adjacent channel interference that can be addressed by some example embodiments.

Methods and apparatus to mitigate interference among multiple wireless subsystems in a wireless communication device are disclosed. Interference between different wireless subsystems can result from radio frequency energy emitted by a first wireless subsystem being received by a second wireless subsystem, e.g., due to spillover, higher order harmonics, intermodulation distortion, or other factors. A host processor in the wireless communication device in conjunction with the multiple wireless subsystems can monitor operating conditions to detect configurations of the wireless subsystems that can result in potential or actual radio frequency interference between two or more of the multiple wireless subsystems in the wireless communication device. The host processor can initiate wireless coexistence operations for a subset of the multiple wireless subsystems based on detection of a wireless interference condition. The host processor can provide information about wireless subsystem configurations to one or more wireless subsystems, establish link quality reporting parameters for the multiple wireless subsystems, and obtain link quality reports from the multiple wireless subsystems. When a link quality of a first wireless subsystem fails a set of link quality conditions, the host processor can provide one or more requests to a second wireless subsystem to adjust settings to mitigate interference into the first wireless subsystem. Representative settings to adjust can include transmit power levels, transmit data rates, time periods for transmission, transmit frequencies, data requirements for one or more applications, real time encoding and/or streaming data rates, frequency hopping masks, operating modes, transmission timing, radio resource requests, channel quality indicator reporting values, and/or buffer status report values. The first and second wireless subsystems can be interconnected by a real time communication interface, and each of the wireless subsystems can provide information and/or requests to each other in order to facilitate interference mitigation. A wireless subsystem can adjust its own operation in response to one or more requests from the host processor and/or from another wireless subsystem in the wireless communication device. Modification of operation by a wireless subsystem can be conditioned on operating states and/or link quality conditions for the wireless subsystem. In some embodiments, one wireless subsystem can have priority for data transmission and/or data reception over another wireless subsystem. In some embodiments, a wireless subsystem can prioritize its own transmission or reception to ensure stability during critical operations and/or to ensure transmission or reception of data or signaling messages during particular procedures. The host processor can monitor adherence by one or more wireless subsystems to requests to perform one or more actions in order to mitigate interference, and the host processor can undertake additional actions to mitigate interference when a wireless subsystem does not honor one or more particular requests.

A wireless subsystem of the wireless communication device can include transmitters and receivers to provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless subsystem can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless subsystem can be referred to herein as a radio and can include one or more components as described hereinabove.

Some example embodiments address an in-device coexistence problem between radios using disparate wireless communication technologies. In this regard, wireless communication devices often include multiple radios, each of which can implement one or more disparate wireless communication technologies, which coexist on the device. For example, a cellular radio, such as a Long Term Evolution (LTE) radio, can coexist on a device along with one or more connectivity radios, such as a Bluetooth radio, WLAN (e.g., Wi-Fi) radio, and/or the like. In embodiments including a Wi-Fi Radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. The connectivity radio can use an ISM band.

For example, Bluetooth can operate in the 2.4 GHz ISM band, while a WLAN radio can operate in the 2.4 GHz and/or 5 GHz ISM bands. The cellular radio and/or connectivity radio(S) can further coexist with a Global Navigation Satellite System (GNSS) radio, such as a Global Positioning System (GPS) radio, GLONASS radio, and/or other GNSS radio, which can operate in the 1.6 GHz band.

Concurrent operation of multiple radios on a wireless communication device can result in interference between radios. In this regard, interference can result from a transmission emitted by a radio using an aggressor technology while a radio is receiving data via a victim technology. In such situations, the aggressor technology transmissions can inhibit data reception via the victim technology, potentially resulting in received data errors, or in extreme cases, even completely deafening the victim technology receiver. This radio frequency (RF) interference can be caused by a number of side effects that can result from concurrent radio operation on a device.

For example, RF interference can result from adjacent channel interference (ACI), in which transmit energy spills over into adjacent bands. FIG. 1 illustrates an example of ACI that can be addressed by some example embodiments. In this regard, one or more cellular bands can be adjacent to an ISM band that can be used by a connectivity radio. In the example of FIG. 1, LTE band 40 using time-division duplexing (TDD) 102 can operate in the 2300-2400 MHz band range, while LTE band 7 using frequency-division duplexing (FDD) for uplink (UL) communications 104 can operate in the 2500-2570 MHz band range. The LTE bands 102 and 104 can act as aggressor bands such that transmissions via these bands can interfere with reception via connectivity radios operating in the adjacent 2400 GHz ISM band. For example, as illustrated in FIG. 1, a Bluetooth radio operating in the 2402-2480 MHz band 106 and a Wi-Fi radio operating in the 2400-2483.5 MHz band 108 can suffer as victims from adjacent channel interference resulting from the LTE bands 102 and 104, as transmit energy from LTE bands 102 and 104 can spill over into the bands 106 and 108 and can de-sense the Bluetooth and Wi-Fi radios, potentially interfering with data reception by the Bluetooth and Wi-Fi radios.

As another example, intermodulation distortion can result in RF interference that can harm reception by a radio. In this regard, harmonics can be generated when two or more transmit frequencies "mix" with each other due to non-linearity. For example, cellular bands 5 and/or 8 can mix with 2.4 GHz ISM band transmissions to de-sense a GNSS receive band. As still a further example, RF interference can result form harmonic distortion in which harmonics can be generated from a single transmit frequency due to a non-linearity.

For example, when a device communicates concurrently via cellular communications and a lower powered communication technology, such as an IEEE 802.15 wireless personal area network (PAN) communication technology (e.g., Bluetooth and/or other wireless PAN communication technology) or WLAN technology, which can, for example, utilize an ISM band, cellular transmissions can prevent data reception via the lower powered technology. Some example embodiments facilitate in-device coexistence between wireless communication technologies by mitigating such in-device interference conditions.

Several example embodiments described herein can facilitate in-device coexistence between radios by mitigating the effects of such RF interference conditions. In this regard, some example embodiments provide an architecture and corresponding methods, apparatuses, and computer program products for facilitating in-device coexistence between radios. More particularly, some example embodiments provide an architecture in which a host processor can be configured to define a coexistence policy for two or more radios (e.g., a cellular radio, a connectivity radio(s), a GNSS radio, and/or the like) that can be implemented on a wireless communication device. The coexistence policy of some example embodiments can define a priority between radios given a present use case context such that a radio can be given priority over another radio based on a given use case context. The host processor can provide the coexistence policy to the radios via an interface between the host processor and the radios.

The radios of such example embodiments can be configured to exchange state information via a separate interface between the radios. The interface between the radios can be a higher speed interface, which can facilitate real time exchange of state information between the radios. The state information can, for example, be indicative of interference conditions experienced by a radio, operating state information indicative of whether a radio is transmitting or receiving data during a given time period, and/or the like. As such, state information that can change frequently and/or which requires low-latency communication (e.g., in real time) can be exchanged between radios via an interface that can facilitate relatively high speed communication between radios. In this regard, some example embodiments partition information that can be used by a radio to make a decision for controlling radio operation to mitigate in-device interference into non-real time information that does not change relatively frequently, such as coexistence policies, and state information for the co-located radio(s) that can change frequently over time. The coexistence policies and/or other non-real time information that may not change frequently can accordingly be communicated between a host processor and radios via a slower speed interface(s) and/or shared interface via which other information can be communicated without clogging a higher speed, direct interface between radios.

A radio in accordance with some example embodiments can use state information received from another radio to control radio operation in accordance with the coexistence policy provided by the host processor. In this regard, a radio can have knowledge of conditions experienced by and/or activities being performed by a co-located radio based on the state information and can use this knowledge to determine whether to modify radio operation to mitigate interference with the co-located radio in accordance with the coexistence policy at a given time. Thus, for example, an aggressor radio, such as a cellular radio, can know from the state information whether a victim radio, such as a Bluetooth radio, is receiving data at a given time and, if the victim radio is receiving data at a given time and has a higher defined priority based on the coexistence policy, the aggressor radio can take action, such as backing off transmission power, to mitigate interference with data reception by the victim radio. If, however, the victim radio is not receiving data at a given time, the aggressor radio can know based on the state information that it can transmit data without regard for the victim radio at that point in time, even if the victim radio has a higher priority based on the coexistence policy.

Figure 2:
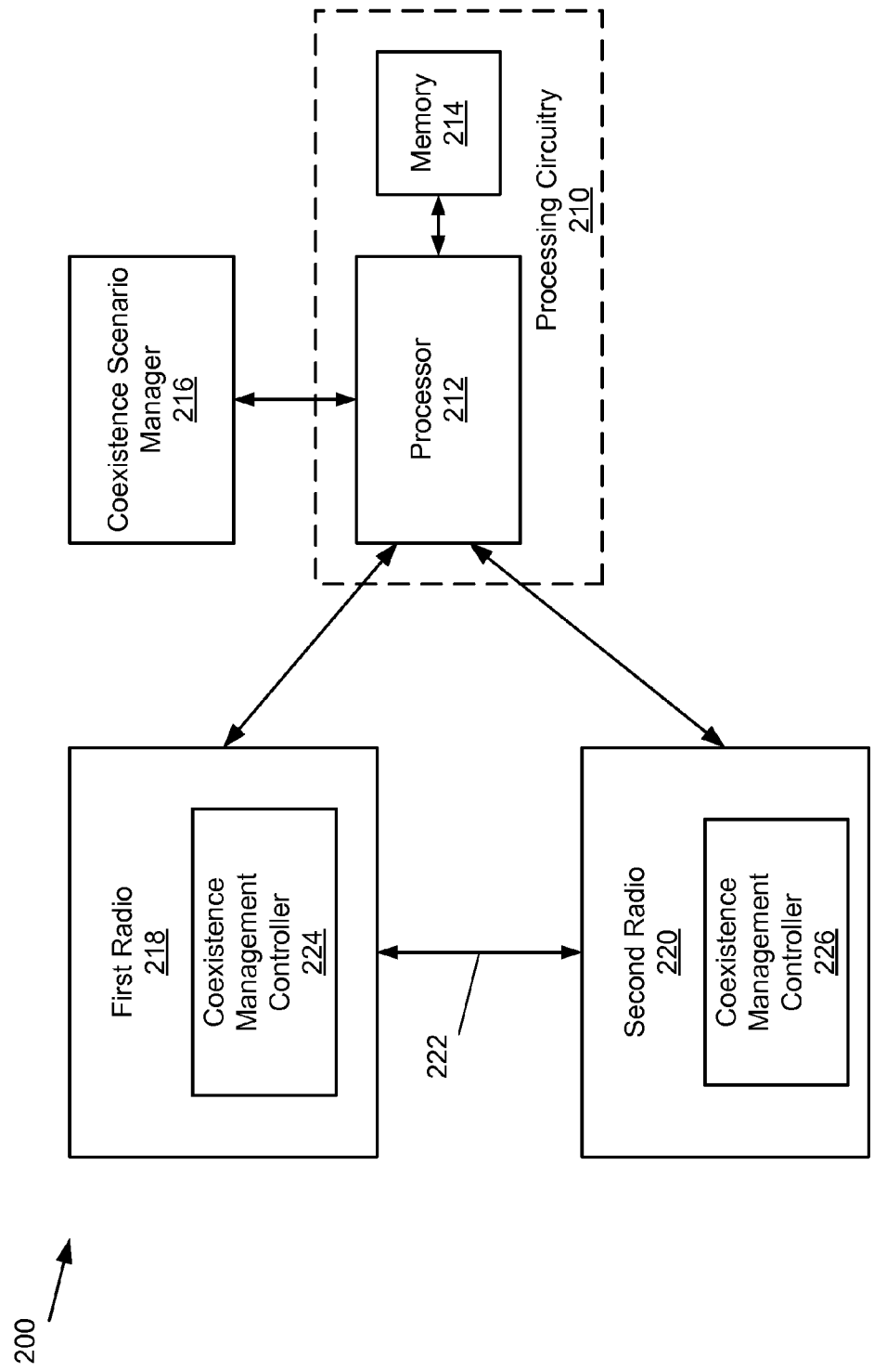
FIG. 2 illustrates a block diagram of a wireless communication device in accordance with some example embodiments.

Referring now to FIG. 2, FIG. 2 illustrates a block diagram of a wireless communication device 200 in accordance with some example embodiments. The wireless communication device 200 can be any device including two or more co-located radios, which can enable the device to communicate via multiple wireless communication technologies. By way of non-limiting example, the wireless communication device 200 can be a mobile phone, tablet computing device, laptop computer, or other computing device that can include multiple radios. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the wireless communication device 200 can include processing circuitry 210 that is configurable to perform actions in accordance with one or more example embodiments disclosed herein. In this regard, the processing circuitry 210 can be configured to perform and/or control performance of one or more functionalities of the wireless communication device 200 in accordance with various example embodiments, and thus can provide means for performing functionalities of the wireless communication device 200 in accordance with various example embodiments. The processing circuitry 210 may be configured to perform data processing, application execution and/or other processing and management services according to one or more example embodiments. In some embodiments, the wireless communication device 200 or a portion(s) or component(s) thereof, such as the processing circuitry 210, can include one or more chips, or one or more chipsets. The processing circuitry 210 and/or one or more further components of the wireless communication device 200 can therefore, in some instances, be configured to implement an embodiment on a single chip or chipset.

In some example embodiments, the processing circuitry 210 can include a processor 212 and, in some embodiments, such as that illustrated in FIG. 2, can further include memory 214. The processing circuitry 210 can be in communication with or otherwise control a coexistence scenario manager 216 and two or more radios that can be implemented on the wireless communication device 200, including a first radio 218 and second radio 220.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor 212 of some example embodiments can be a host processor configured to serve as a host for controlling or otherwise facilitating operation of two or more device radios, such as the first radio 218 and second radio 220. In some example embodiments, the processor 212 can be an application processor. Although illustrated as a single processor, it will be appreciated that the processor 212 can comprise a plurality of processors. The plurality of processors can be in operative communication with each other and can be collectively configured to perform one or more functionalities of the wireless communication device 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the wireless communication device 200 to carry out various functions in accordance with one or more example embodiments. In some embodiments, the memory 214 can be in communication with one or more of the processor 212, coexistence scenario manager 216, first radio 218, or second radio 220 via a bus(es) for passing information among components of the wireless communication device 200.

The wireless communication device 200 can further include coexistence scenario manager 216, which can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the coexistence scenario manager 216. As will be described further herein below, the coexistence scenario manager 216 can be configured to define a coexistence policy for two or more radios on the wireless communication device 200, such as the first radio 218 and second radio 220, and can provide the coexistence policy to the radios for implementation.

As noted, the wireless communication device 200 can include a plurality of co-located radios. Two such radios—the first radio 218 and second radio 220—are illustrated by way of example in FIG. 2. It will be appreciated, however, that the wireless communication device 200 can include one or more further radios in some example embodiments. The radios implemented on the wireless communication device 200 can each implement any respective wireless communication technology such that two or more disparate wireless communication technologies can be implemented on the wireless communication device 200. For example, in some example embodiments, one or more radios on the wireless communication device 200, such as one or more of the first radio 218 or second radio 220, can implement a cellular communication technology, such as a Long Term Evolution (LTE) cellular communication technology, a Universal Mobile Telecommunications System (UMTS) cellular communication technology, a Global System for Mobile Communications (GSM) cellular communication technology, a Code Division Multiple Access (CDMA) cellular communication technology, or a CDMA 2000 cellular communication technology, and/or the like. As a further example, in some example embodiments, one or more radios on the wireless communication device 200, such as one or more of the first radio 218 or second radio 220, can be a connectivity radio implementing a communications technology, such as Bluetooth, Zigbee, and/or other wireless personal area network (PAN) technology; and/or Wi-Fi and/or other wireless local area network (WLAN) communication technology. In some example embodiments, in which one or more of the first radio 218 or second radio 220 is a connectivity radio, the connectivity radio can implement a wireless communication technology using an ISM band. As still a further example, the wireless communication device 200 of some example embodiments can include a GNSS radio. It will be appreciated, however, that the foregoing example radio technologies are provided by way of example, and not by way of limitation, as various example embodiments support in-device coexistence between any two (or more) radios that use disparate wireless communication technologies.

An interface 222 can be used to interface two or more radios, such as the first radio 218 and second radio 220, on the wireless communication device 200. The interface 222 can be separate from an interface(s) between the processor 212 and the first radio 218 and second radio 220. The interface 222 can be a higher speed interface than the interface(s) between the radios and processor 212, which can offer low latency to allow (e.g., on the order of microseconds) for communication of real time state information between radios. The interface 222 of some example embodiments can be an interface dedicated to the exchange of information between radios, which may not be used for communication of information to or from non-radio components of the wireless communication device 200. In some example embodiments, the interface 222 can be a direct interface linking the first radio 218 and second radio 220 (and potentially one or more further radios). In some example embodiments, the interface 222 can be a Wireless Coexistence Interface (WCI), such as a WCI-2 interface, WCI-1 interface, or other type of WCI. It will be appreciated, however, that WCI interface types are but one example of an interface that can be used to facilitate communication of state information between radios, and any appropriate interface that can be used to interface two or more radios to support the exchange of state information between radios can be used in addition to or in lieu of an WCI interface in accordance with some example embodiments.

In some example embodiments, radios implemented on the wireless communication device 200 can include respective coexistence management controllers. For example, a first radio coexistence management controller 224 can be implemented on the first radio 218 and a second radio coexistence management controller 226 can be implemented on the second radio 220. The coexistence management controllers (e.g., the first radio coexistence management controller 224 and the second radio coexistence management controller 226) can be embodied as various means, such as circuitry, hardware, a computer program product comprising computer readable program instructions stored on a computer readable medium that can be implemented on a radio and executed by a processing device that can be implemented on a radio, or some combination thereof.

The coexistence scenario manager 216 can be configured to define a coexistence policy for radios implemented on the wireless communication device 200, such as the first radio 218 and second radio 220. The coexistence policy can, for example define priority levels across device radios, such as cellular, GNSS, Bluetooth, Wi-Fi, and/or the like. In this regard, the coexistence scenario manager 216 can maintain a "global" view of the priority levels across the various radios. The coexistence policy can be defined based on a present use case context of the wireless communication device 200. For example, a different coexistence policy can be defined and implemented in a use case context in which a user of a cellular phone is using a Bluetooth headset while on an active cellular call than in a use case context in which a user is engaged in an active data session over a cellular connection. As such, use case context-based coexistence priority levels in accordance with some example embodiments can change relatively slowly in non-real time over time in response to event triggers.

The coexistence scenario manager 216 can be further configured to push the coexistence policy down to the device radios via an interface(s) between the processor 212 and the device radios. The interface(s) between the processor 212 and the first radio 218 and second radio 220 can be a non-real time interface(s). Communication of the coexistence policy to the radios can be primarily event-triggered. In this regard, the coexistence policy can be changed in response to event triggers as the use case context of the device changes over time, such as in response to user activity.

Implementation and execution of the coexistence policy can be performed by the coexistence management controllers on the radios based on coordination amongst the radios via the interface 222. In this regard, the coexistence management controllers (e.g., the first radio coexistence management controller 224 and the second radio coexistence management controller 226) can be configured to perform measurements and exchange state information between the radios via the interface 222. As will be described further herein below, the state information can include an indication of an interference condition experienced by a radio, operating state information for a radio, and/or other information that can be used by a coexistence management controller to determine whether to modify radio operation to mitigate interference with another radio in accordance with the coexistence policy at a given time.

A coexistence management controller, such as the first radio coexistence management controller 224 and the second radio coexistence management controller 226, on a radio can perform real-time actions to control radio operation based on a coexistence policy defined by the coexistence scenario manager 216 and one or more of state information that can be provided by a co-located radio or measurements that can be made by the radio. In this regard, a coexistence management controller can determine whether to take corrective action to mitigate interference with a co-located radio in accordance with a coexistence policy based on measurements that can be made by the radio and/or state information that can be provided by the co-located radio.

As such, it will be appreciated that some example embodiments partition information that can be used by a coexistence management controller, such as the first radio coexistence management controller 224 and the second radio coexistence management controller 226, to make a decision for controlling radio operation to mitigate in-device interference into non-real time information that does not change relatively frequently, such as coexistence policies, and real time state information for the co-located radio(s) that can change frequently over time. The coexistence policies and/or other non-real time information that may not change with a great deal of regularity can accordingly be communicated to the first radio 218 and second radio 220 by the processor 212 via a slower speed interface(s) and/or shared interface (e.g., a shared bus) via which other information can be communicated between device components. Real time state information for the radios can be communicated via the interface 222, which can offer lower latency for communication of state information that can change relatively frequently (e.g., in real time) between the radios to allow for coordination between radios. As non-real time information can be provided to the radios via another interface(s), the interface 222 provision of the non-real time information to the device radios does not clog the interface 222 or otherwise cause a delay in communication of real time state information between radios.

A coexistence management controller implemented on a radio, such as the first radio coexistence management controller 224 and the second radio coexistence management controller 226, can use any appropriate technique to control radio operation to take corrective action so as to mitigate interference with a co-located radio when determined to be appropriate in accordance with a coexistence policy. In this regard, a coexistence management controller can use one or more hardware-based techniques and/or one or more software-based techniques for reducing interference.

As an example of a hardware-based technique that can be used, a coexistence management controller in accordance with some example embodiments can be configured to modify filtering that can be applied to transmissions, such as by applying sharper filtering to aggressor radio transmissions to reduce adjacent channel interference with a victim radio. As another example hardware-based technique that can be used by a coexistence management controller to mitigate interference, a coexistence management controller in accordance with some example embodiments can be configured to adjust a linearity of RF components of an aggressor radio, such as by reducing or increasing linearity as appropriate, to mitigate the effects of intermodulation distortion and/or harmonic distortion interference with a victim radio.

As an example of a software-based technique that can be used, a coexistence management controller in accordance with some example embodiments can be configured to apply time domain sharing techniques to mitigate the effects of interference. In this regard, if a victim radio has lower priority than an aggressor radio, the coexistence management controller on the victim radio can avoid receiving data when an aggressor radio(s) is (are) transmitting. The coexistence management controller on the victim radio can know whether the aggressor radio is transmitting at a given time based on state information that can be provided by the aggressor radio (e.g., via interface 222) and/or based on measurements that can be performed by the victim radio. Similarly, if a victim radio is defined by the coexistence policy to have higher priority than an aggressor radio during a particular time period and is receiving data during the time period, the coexistence management controller on the aggressor radio can avoid transmitting data during the victim radio's high priority reception period. The coexistence management controller on the aggressor radio can know whether the victim radio is receiving data during a time period based on state information that can be provided by the victim radio (e.g., via interface 222) and/or based on measurements that can be performed by the aggressor radio.

As another example of a software-based technique that can be used, a coexistence management controller in accordance with some example embodiments can be configured to apply frequency domain exclusion techniques to mitigate interference with a co-located radio. For example, a coexistence management controller on a victim radio can be configured to avoid reception on a frequency channel(s) affected by aggressor radio transmissions, if avoiding reception on the affected channel(s) is possible. The coexistence management controller on the victim radio can, for example, have knowledge of a frequency channel affected by aggressor radio transmissions based on measurements that can be performed by the victim radio. The channel(s) affected by the aggressor transmissions can, for example, be the channel(s) within a band used by the victim radio immediately adjacent to a band used by the aggressor radio. In some example embodiments, the coexistence management controller on the victim radio can be configured to apply frequency domain exclusion techniques during periods which the aggressor radio is known by the victim radio to be transmitting. In this regard, the coexistence management controller on the victim radio can know whether the aggressor radio is transmitting at a given time based on state information that can be provided by the aggressor radio (e.g., via interface 222) and/or based on measurements that can be performed by the victim radio.

A coexistence management controller on an aggressor radio can, for example, be configured to apply frequency domain exclusion techniques to avoid transmission on a channel(s) that can be more damaging to a victim radio, if avoiding transmission on the channel(s) is possible. The channel(s) that can be more damaging to the victim radio can, for example, be the channel(s) within a band used by the aggressor radio immediately adjacent to a band used by the victim radio. In some example embodiments, the coexistence management controller on the aggressor radio can be configured to apply frequency domain exclusion techniques during periods which the victim radio is known by the aggressor radio to be receiving data. In this regard, the coexistence management controller on the aggressor radio can know whether the victim radio is receiving at a given time based on state information that can be provided by the victim radio (e.g., via interface 222) and/or based on measurements that can be performed by the aggressor radio.

As a further example of a software-based technique that can be used, a coexistence management controller in accordance with some example embodiments can be configured to apply power domain exclusion techniques to mitigate interference with a co-located radio. For example, if there are multiple aggressor radios on a device, a coexistence management controller on a first aggressor radio can avoid transmitting concurrently with the second aggressor radio so as to limit the total transmission power emitted by the device and/or to avoid causing intermodulation distortion to mitigate interference with a victim radio. In this example, the coexistence policy may accord a lower priority to the first aggressor radio than to the second aggressor radio and the victim radio such that the coexistence management controller on the first aggressor radio can back off and avoid transmitting, thereby yielding to transmission by the second aggressor radio and mitigating interference with the victim radio. The coexistence management controller on the first aggressor radio can determine to avoid transmitting based on knowledge of whether the second aggressor radio is transmitting at a given time and/or whether the victim radio is receiving at a given time. In this regard, the coexistence management controller on the first aggressor radio can know whether the second aggressor radio is transmitting and/or whether the victim radio is receiving during a given period of time based on state information that can be provided by the second aggressor radio and/or by the victim radio (e.g., via interface 222) and/or based on measurements that can be performed by the first aggressor radio.

Another example of a power domain exclusion technique that can be implemented by the coexistence management controller of an aggressor radio is backing off transmission power of the aggressor radio if the victim radio is receiving. In this regard, limiting the transmission power can reduce a level of interference with reception by the victim radio. The coexistence management controller can know whether the victim radio is receiving during a given period of time based on state information that can be provided by the victim radio (e.g., via interface 222) and/or based on measurements that can be performed by the aggressor radio.

Figure 3:
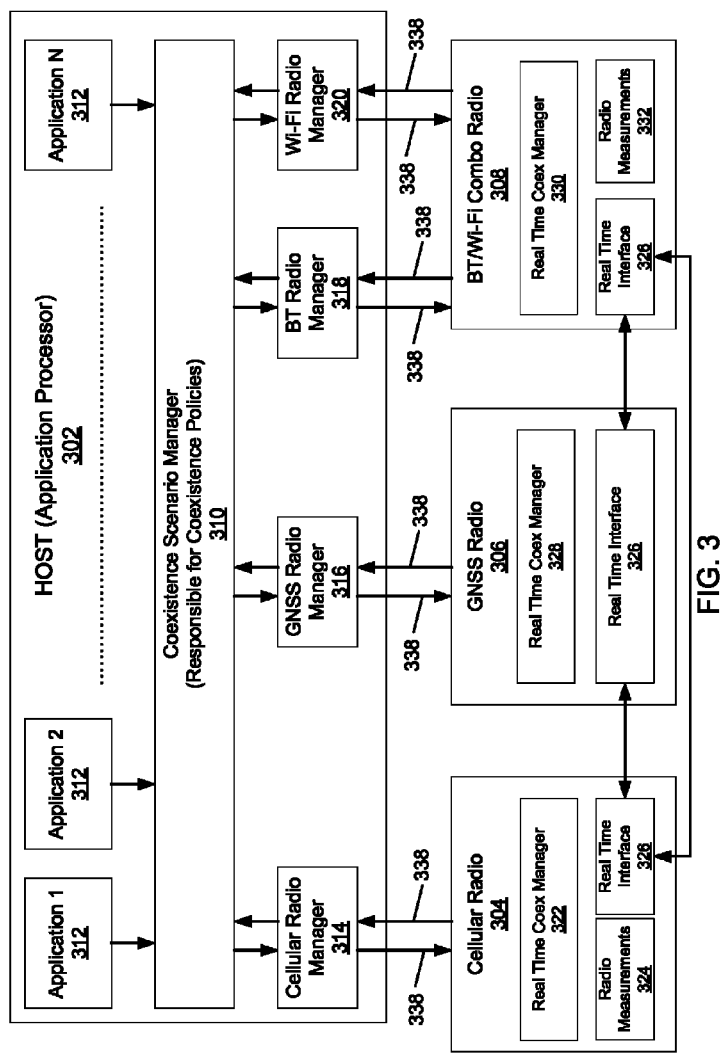
FIG. 3 illustrates an architecture for facilitating in-device coexistence between radios in accordance with some example embodiments.

FIG. 3 illustrates an example architecture for facilitating in-device coexistence between radios in accordance with some example embodiments. The architecture can include a HOST 302, which can be embodied as an application processor. The HOST 302 can, for example, be an embodiment of the processor 212 and/or of the processing circuitry 210. The architecture can further include a plurality of radios. In the example of FIG. 3, the architecture can include a cellular radio 304, a GNSS radio 306, and a Bluetooth (BT)/Wi-Fi combo radio 308. It will be appreciated, however, that the combination of radios illustrated in FIG. 3 is illustrated by way of example, and not by way of limitation. In this regard, one or more of the cellular radio 304, GNSS radio 306, and BT/Wi-Fi combo radio 308 can be omitted in some example embodiments. Further, in some example embodiments, the architecture can include one or more other radios in addition to or in lieu of the radios illustrated in and described with respect to FIG. 3. Moreover, the use of a BT/Wi-Fi combo radio is by way of example, and some example embodiments can include a standalone Bluetooth radio and/or a standalone Wi-Fi radio. As such, it will be appreciated that the architectural structure and corresponding techniques illustrated in and described with respect to FIG. 3 can be applied mutatis mutandis to any combination of radios that can be implemented on a wireless communication device.

The HOST 302 can include a coexistence scenario manager 310, which can be responsible for defining coexistence policies for the device radios and providing the coexistence policies to the device radios. In this regard, the coexistence scenario manager 310 can, for example, be an embodiment of the coexistence scenario manager 216. One or more applications 312 can be running on the HOST 302. The coexistence scenario manager 310 can accordingly have knowledge of the application(s) 312 that are active at a given time. In some example embodiments, the coexistence scenario manger 310 can determine corresponding use case state information for active applications. In this regard, the coexistence scenario manager 310 can leverage knowledge of a state of applications 312 to derive a global view of the device usage and determine a present use case context for the device. The coexistence scenario manager 310 can be configured to define a coexistence policy for the device radios based at least in part on the present use case context. The coexistence policy can include a definition of one or more priorities between device radios with respect to the use case context.

The coexistence scenario manager 310 can be configured to provide a defined coexistence policy to the device radios via respective radio manager intermediaries that can be implemented on the HOST 302. For example, a cellular radio manager 314 can facilitate communication between the coexistence scenario manager 310 and cellular radio 304. A GNSS radio manager 316 can facilitate communication between the coexistence scenario manager 310 and GNSS radio 306. A BT radio manager 318 can facilitate communication between the coexistence scenario manager 310 and the BT portion of the BT/Wi-Fi combo radio 308. A Wi-Fi radio manager 320 can facilitate communication between the coexistence scenario manager 310 and the Wi-Fi portion of the BT/Wi-Fi combo radio 308.

The coexistence scenario manager 310 can be configured to use an interface(s) 338 to provide a coexistence policy to the radios (e.g., via the respective radio manager intermediaries 314-320). The interface(s) 338 can be a non-real time interface(s), which can be used for large message transfers, and which may have a delay on the order of milliseconds. The interface(s) 338 of some example embodiments can be shared by components of a wireless communication device in addition to the HOST 302 and radios 304-308, and can be used for the communication of data in addition to coexistence policies and/or other information that can be exchanged between the HOST 302 and the radios 304-308.

The cellular radio 304 can include a real time coex manager 322, which can be configured to implement and execute a coexistence policy defined by the coexistence scenario manager 310. In this regard, the real time coex manager 322 can, for example, be an embodiment of a coexistence management controller 224 or coexistence management controller 226) described with respect to FIG. 2. The real time coex manager 322 can be configured to use radio measurements 324 that can be made by the cellular radio 304 and/or state information received from the GNSS radio 306 and/or from the BT/Wi-Fi combo radio 308 via the real time interface 326 to make control decisions for controlling the cellular radio 304 in accordance with the coexistence policy so as to mitigate interference with the GNSS radio 306 and/or with the BT/Wi-Fi Combo radio 308.

The real time interface 326 can be an interface offering a low latency, such as a delay on the order of microseconds, to allow for communication of real time state information between radios to facilitate coordination between radios in accordance with a coexistence policy defined and handed down by the coexistence scenario manager 310. In some example embodiments, the real time interface 326 can be a WCI interface, such as a WCI-2 interface or WCI-1 interface. The real time interface 326 of some example embodiments can be an interface dedicated to the exchange of information between radios, which may not be used for communication of information to or from non-radio components.

The real time coex manager 322 can be further configured to provide state information for the cellular radio 304 to the GNSS radio 306 and/or to the BT/Wi-Fi combo radio 308 via the real time interface 326. The state information can include any information about a state of the cellular radio 304 that can be used by the GNSS radio 306 and/or by the BT/Wi-Fi combo radio 308 to make determinations for radio operation control in compliance with a coexistence policy defined by the coexistence scenario manager 310. For example, the state information can include operating state information indicative of whether the cellular radio 304 is receiving or transmitting data during one or more time periods. The state information can additionally or alternatively include an indication of an interference condition that may be experienced by the cellular radio 304, such as can be determined by the cellular radio 304 based on the radio measurements 324.

The GNSS radio 306 can include a real time coex manager 328, which can be configured to implement and execute a coexistence policy defined by the coexistence scenario manager 310. In this regard, the real time coex manager 328 can, for example, be an embodiment of a coexistence management controller (e.g., the coexistence management controller 224 or coexistence management controller 226) described with respect to FIG. 2. The real time coex manager 328 can, for example, be configured to use measurements that can be made by the GNSS radio 306 and/or state information received from the cellular radio 304 and/or from the BT/Wi-Fi combo radio 308 via the real time interface 326 to make control decisions for controlling the GNSS radio 306 in accordance with the coexistence policy so as to mitigate interference with the cellular radio 304 and/or with the BT/Wi-Fi Combo radio 308.

The real time coex manager 328 can be further configured to provide state information for the GNSS radio 306 to the cellular radio 304 and/or to the BT/Wi-Fi combo radio 308 via the real time interface 326. The state information can include any information about a state of the GNSS radio 306 that can be used by the cellular radio 304 and/or by the BT/Wi-Fi combo radio 308 to make determinations for radio operation control in compliance with a coexistence policy defined by the coexistence scenario manager 310. For example, the state information can include operating state information indicative of whether the GNSS radio 306 is receiving or transmitting data during one or more time periods. The state information can additionally or alternatively include an indication of an interference condition that may be experienced by the GNSS radio 306, such as can be determined based on measurements that can be made by the GNSS radio 306.

The BT/Wi-Fi combo radio 308 can include a real time coex manager 330, which can be configured to implement and execute a coexistence policy defined by the coexistence scenario manager 310. In this regard, the real time coex manager 330 can, for example, be an embodiment of a coexistence management controller (e.g., the coexistence management controller 224 or coexistence management controller 226) described with respect to FIG. 2. The real time coex manager 330 can be configured to use radio measurements 332 that can be made by the BT/Wi-Fi combo radio 308 and/or state information received from the cellular radio 304 and/or from the GNSS radio 306 via the real time interface 326 to make control decisions for controlling the BT/Wi-Fi combo radio 308 in accordance with the coexistence policy so as to mitigate interference with the cellular radio 304 and/or with the GNSS radio 306.

The real time coex manager 330 can be further configured to provide state information for the BT/Wi-Fi combo radio 308 to the cellular radio 304 and/or to the GNSS radio 306 via the real time interface 326. The state information can include any information about a state of the BT/Wi-Fi combo radio 308 that can be used by the cellular radio 304 and/or by the GNSS radio 306 to make determinations for radio operation control in compliance with a coexistence policy defined by the coexistence scenario manager 310. For example, the state information can include operating state information indicative of whether the BT/Wi-Fi combo radio 308 is receiving or transmitting data during one or more time periods. The state information can additionally or alternatively include an indication of an interference condition that may be experienced by the BT/Wi-Fi combo radio 308, such as can be determined by the BT/Wi-Fi combo radio 308 based on the radio measurements 332.

Figure 4:
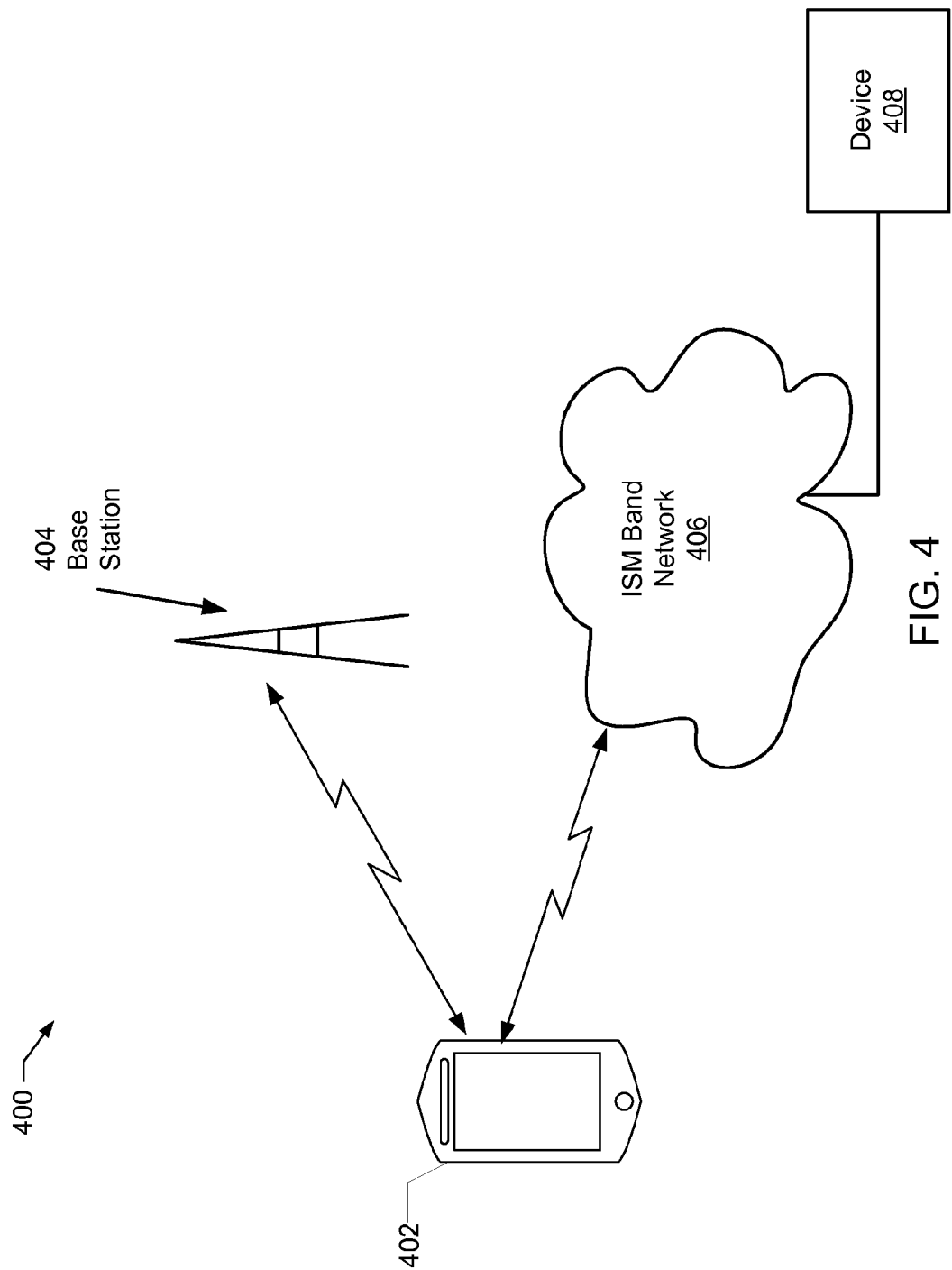
FIG. 4 illustrates an example system in which some example embodiments can be implemented to facilitate in-device coexistence between radios.

FIG. 4 illustrates an example system 400 in which some example embodiments can be implemented to facilitate in-device coexistence between wireless communication technologies. The system 400 can include a wireless communication device 402, which can, for example, be an embodiment of wireless communication device 200. The wireless communication device 402 can be configured to engage in cellular communications, which can be supported by a base station 402. For example, the wireless communication device 402 can be configured to engage in communication via a Long Term Evolution (LTE) cellular communication technology, a Universal Mobile Telecommunications System (UMTS) cellular communication technology, a Global System for Mobile Communications (GSM) cellular communication technology, a Code Division Multiple Access (CDMA) cellular communication technology, or a CDMA 2000 cellular communication technology, and/or other cellular communication technology. The wireless communication device 402 can be further configured to engage in communications via an ISM band technology. Thus, for example, the wireless communication device 402 can engage in wireless communications with a device 408 via an ISM band network 406. For example, in embodiments in which the ISM band network 406 is a Bluetooth network, the device 408 can be a Bluetooth headset or other Bluetooth device that can be interfaced with a wireless communication device.

In context of the system 400, various embodiments, can be implemented on the wireless communication device 402 to control operation of a cellular radio and/or ISM band radio(s) on the wireless communication device 402 to mitigate interference between the device radios in accordance with a coexistence policy to facilitate in-device coexistence between cellular and ISM band radios. It will be appreciated, however, that system 400 is provided merely by way of example. In this regard, as previously noted, some example embodiments facilitate in-device radio coexistence scenarios other than cellular and ISM band radio coexistence.

Figure 5:
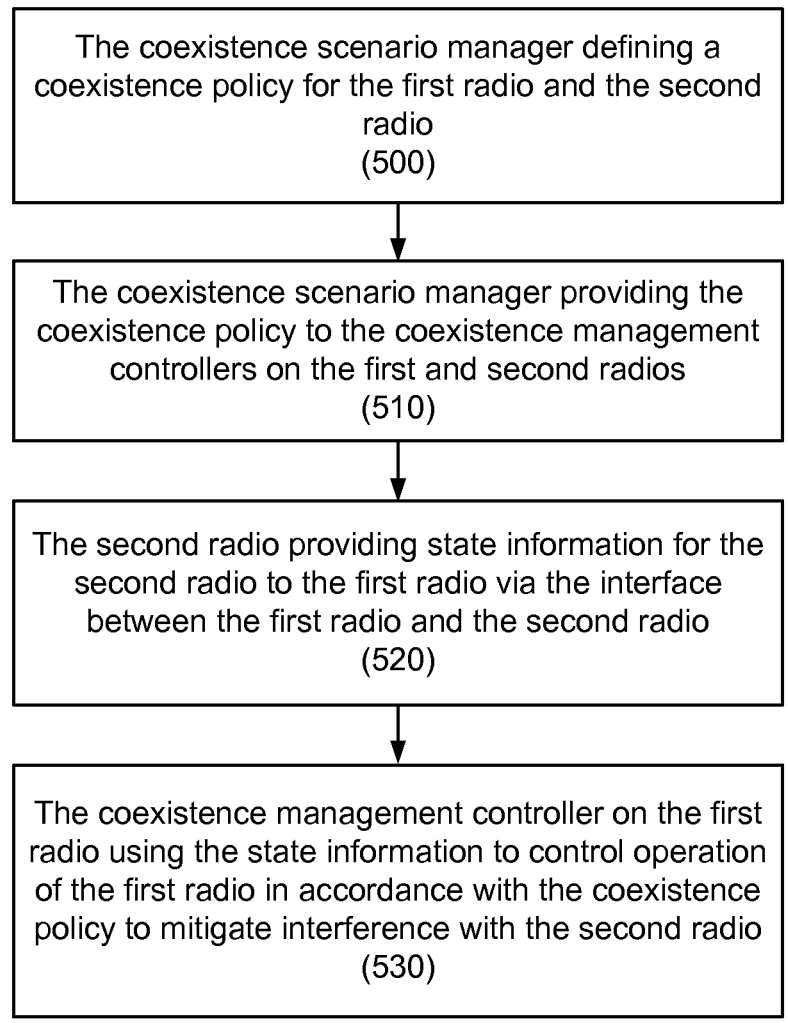
FIG. 5 illustrates a flowchart according to an example method that can be performed by a wireless communication device for facilitating in-device coexistence between radios according to some example embodiments.

FIG. 5 illustrates a flowchart according to an example method that can be performed by a wireless communication device for facilitating in-device coexistence between radios according to some example embodiments. In this regard, FIG. 5 illustrates operations that can be performed by the wireless communication device 200 and/or by the architecture illustrated in FIG. 3. The operations illustrated in and described with respect to FIG. 5 can, for example, be performed to facilitate in-device radio coexistence between cellular and ISM band radios, such as within the context of the system 400.

Operation 500 can include the coexistence scenario manager 216 defining a coexistence policy for the first radio 218 and the second radio 220. The coexistence policy can, for example, define a priority between the first radio 218 and the second radio 220. In some example embodiments, the coexistence policy can be defined based at least in part on a use case context of the wireless communication device, such that a different coexistence policy can be defined for a first use case context than for a second use case context.

Operation 510 can include the coexistence scenario manager 216 providing the coexistence policy to the first radio coexistence management controller 224 and the second radio management controller 226. The coexistence policy can be provided to the first radio 218 and second radio 220 via an interface(s) between the processor 210 and the radios.

The first radio 218 and/or the second radio 220 can exchange state information via the interface 222 to facilitate implementation of the coexistence policy by the first radio coexistence management controller 224 and second radio coexistence management controller 226. Thus, for example, operation 520 can include the second radio 220 providing state information for the second radio 220 to the first radio 218 via the interface 222. The state information can, for example, include an indication of an interference condition that may be experienced by the second radio 220. The state information can additionally or alternatively include operating state information indicating whether the second radio 220 is receiving or transmitting data during one or more time periods. It will be appreciated that the method can include the first radio 218 providing such state information to the second radio 220 in addition to or in lieu of operation 520.

Operation 530 can include the first radio coexistence management controller 224 using the state information received in operation 520 to control operation of the first radio 218 in accordance with the coexistence policy to mitigate interference with the second radio 220. Operation 530 can additionally or alternatively include the first radio coexistence management controller 224 using measurements that can be made by the first radio 218 to control operation of the first radio 218. For example, if the first radio 218 is an aggressor radio, such as a cellular radio, and the second radio 220 is a victim radio, such as a radio implementing an ISM band wireless communication technology, and the coexistence policy defines that the second radio 220 has priority over the first radio 218 in a given scenario, the first radio coexistence management controller 224 can control data transmission by the first radio 218 to mitigate interference with data reception by the second radio 220. In this regard, the first radio coexistence management controller 224 can use any hardware-based and/or software-based technique for mitigating interference, such as adjusting filtering of transmissions, adjusting linearity of RF components, time domain sharing techniques, frequency domain exclusion techniques, power domain techniques, some combination thereof, or the like to mitigate interference with reception by the second radio 220. It will be appreciated, however, that other scenarios are contemplated within the scope of the disclosure, including the first radio 218 being a victim radio, the second radio 220 being an aggressor radio, the first radio 218 using a wireless communication technology other than cellular, the second radio 220 using a non-ISM band wireless communication technology, the first radio 218 having priority over the second radio 220, coordination with one or more further co-located radios, or some combination thereof.

It will be appreciated that the method can include the second radio coexistence management controller 226 controlling operation of the second radio 220 in accordance with the coexistence policy in addition to or in lieu of operation 530. In this regard, the second radio coexistence management controller 226 can use state information for the first radio 218 that can be received via the interface 222 and/or measurements that can be made by the second radio 220 to control operation of the second radio 220 in accordance with the coexistence policy.

Figure 6:
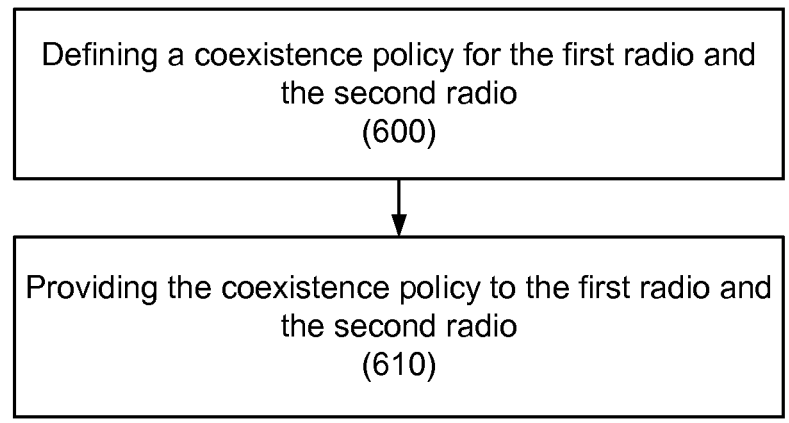
FIG. 6 illustrates a flowchart according to an example method that can be performed by a processor of a wireless communication device for facilitating in-device coexistence between radios according to some example embodiments.

FIG. 6 illustrates a flowchart according to an example method that can be performed by a processor of a wireless communication device for facilitating in-device coexistence between radios according to some example embodiments. In this regard, FIG. 6 illustrates operations that can, for example, be performed by processing circuitry 210, processor 212, coexistence scenario manager 216, Host 302, coexistence scenario manager 310, some combination thereof, or the like.

Operation 600 can include the processor defining a coexistence policy for the first radio 218 and the second radio 220. The coexistence policy can, for example, define one or more priorities between radios. It will be appreciated that in devices having three or more radios, operation 600 can include defining a coexistence policy including the additional radios. Operation 610 can include the processor providing the coexistence policy to the first radio 218 and the second radio 220 via an interface(s) between the processor and the radios. The coexistence policy can configure coexistence management controllers on the radios (e.g., first radio coexistence management controller 224, second radio coexistence management controller 226, real time coex manager 322, real time coex manager 328, real time coex manager 330, and/or the like) to control operation of the radios based at least in part on state information that can be exchanged between the radios.

Figure 7:
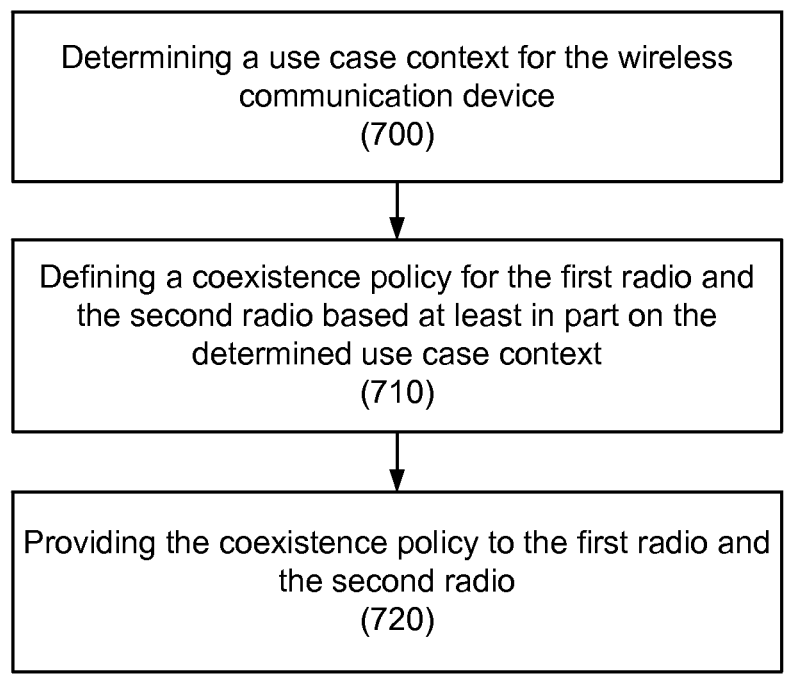
FIG. 7 illustrates a flowchart according to another example method that can be performed by a processor of a wireless communication device for facilitating in-device coexistence between radios according to some example embodiments.

FIG. 7 illustrates a flowchart according to another example method that can be performed by a processor of a wireless communication device for facilitating in-device coexistence between radios according to some example embodiments. In this regard, FIG. 7 illustrates an example method in which a coexistence policy can be defined based at least in part on a current use case context of a wireless communication device. Processing circuitry 210, processor 212, coexistence scenario manager 216, Host 302, coexistence scenario manager 310, some combination thereof, or the like can, for example, provide means for performing the operations illustrated in and described with respect to FIG. 7.

Operation 700 can include the processor determining a use case context for the wireless communication device. The use case context can, for example, be determined based at least in part on a set of applications (e.g., applications 312) active on the device and/or a usage state of one or more such active applications. Operation 710 can include the processor defining a coexistence policy for the first radio 218 and the second radio 220 based at least in part on the determined use case context. The coexistence policy can, for example, define one or more priorities between radios. Thus, for example, one radio may have priority given a first use case context and another radio may have priority given a second use case context. It will be appreciated that in devices having three or more radios, operation 710 can include defining a coexistence policy including the additional radios. Operation 720 can include the processor providing the coexistence policy to the first radio 218 and the second radio 220 via an interface(s) between the processor and the radios. In this regard, operation 720 can correspond to operation 610 as described above. As use case context of the device changes over time, the method can return to operation 700, and the method can be repeated such that a new coexistence policy can be defined in response to a change in use case context.

Figure 8:
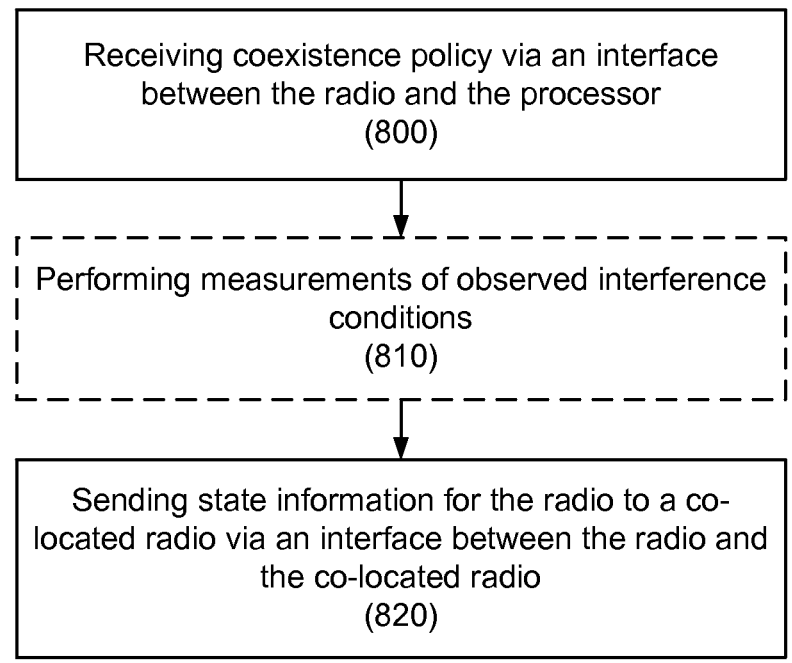
FIG. 8 illustrates a flowchart according to an example method that can be performed by a radio for facilitating in-device coexistence between radios according to some example embodiments.

FIG. 8 illustrates a flowchart according to an example method that can be performed by a radio for facilitating in-device coexistence between radios according to some example embodiments. In this regard, FIG. 8 illustrates a method that can be performed by the first radio 218, second radio 220, cellular radio 304, GNSS radio 306, BT/Wi-Fi combo radio 308, and/or other radio that can be implemented on a wireless communication device. A coexistence management controller (e.g., first radio coexistence management controller 224, second radio coexistence management controller 226, real time coex manager 322, real time coex manager 328, real time coex manager 330, and/or the like) can, for example, provide means for performing one or more of the operations illustrated in and described with respect to FIG. 8.

Operation 800 can include a radio receiving a coexistence policy via an interface between the radio and a host processor, such as the processor 212, HOST 302, or the like. The method can optionally further include operation 810, which can include the radio performing measurements. The measurements can, for example, include performing measurements of observed interference conditions, such as any observed errors in data reception, leakage from adjacent bands, harmonics, and/or other signals or frequencies that may result from operation of a co-located radio(s) and that may interfere with operation of the radio. Operation 820 can include the radio sending state information for the radio to a co-located radio(s) via an interface, such as interface 222 or interface 326, between the radio and the co-located radio(s). The state information can, for example, include operating state information indicative of whether the radio is receiving or transmitting data during one or more time periods. In embodiments including operation 810, the state information can additionally or alternatively include an indication of an interference condition experienced by the radio, as can be defined based on measurements that can be made by the radio.

Figure 9:
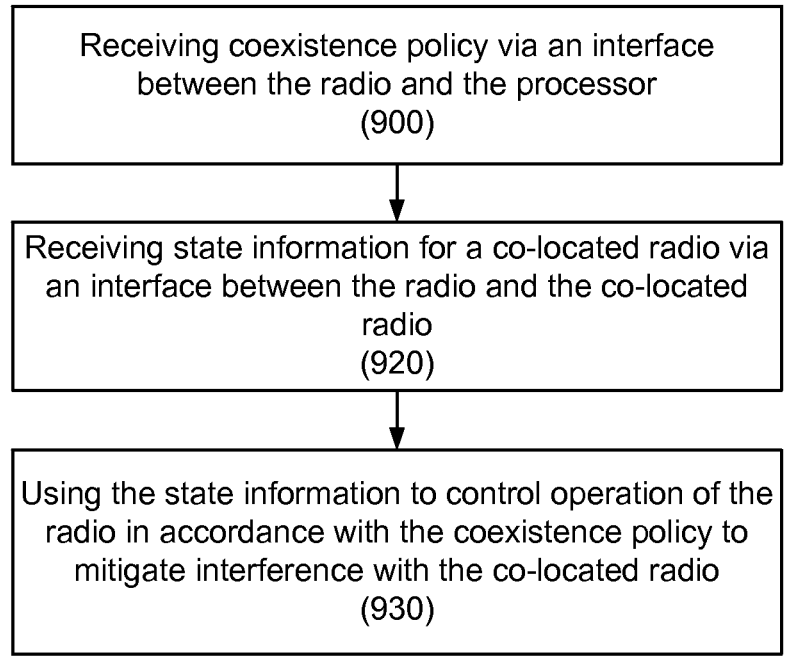
FIG. 9 illustrates a flowchart according to another example method that can be performed by a radio for facilitating in-device coexistence between radios according to some example embodiments.

FIG. 9 illustrates a flowchart according to another example method that can be performed by a radio for facilitating in-device coexistence between radios according to some example embodiments. In this regard, FIG. 9 illustrates a method that can be performed by the first radio 218, second radio 220, cellular radio 304, GNSS radio 306, BT/Wi-Fi combo radio 308, and/or other radio that can be implemented on a wireless communication device. A coexistence management controller (e.g., first radio coexistence management controller 224, second radio coexistence management controller 226, real time coex manager 322, real time coex manager 328, real time coex manager 330, and/or the like) can, for example, provide means for performing one or more of the operations illustrated in and described with respect to FIG. 9.

Operation 900 can include the radio receiving a coexistence policy via an interface between the radio and a host processor, such as the processor 212, HOST 302, or the like. Operation 920 can include the radio receiving state information for a co-located radio via an interface, such as interface 222 or interface 326, between the radio and the co-located radio. Thus, for example, operation 920 can include the radio receiving state information that can be provided by the co-located radio in accordance with performance of operation 820 by the co-located radio.

Operation 930 can include the radio using the state information for the co-located radio to control operation of the radio in accordance with the coexistence policy to mitigate interference with the co-located radio. It will be appreciated that the radio can use any hardware-based and/or software-based technique for mitigating interference, such as adjusting filtering of transmissions, adjusting linearity of RF components, time domain sharing techniques, frequency domain exclusion techniques, power domain techniques, some combination thereof, or the like to mitigate interference with the co-located radio.

Some embodiments disclosed herein provide an architecture and corresponding methods, apparatuses, and computer program products for facilitating in-device coexistence between radios. For example, some example embodiments facilitate coexistence between a cellular radio and a connectivity radio, such as a connectivity radio using an Industrial, Scientific, and Medical (ISM) band. More particularly, some example embodiments provide an architecture in which a host processor can be configured to define a coexistence policy for two or more radios that can be implemented on a wireless communication device. The coexistence policy of some example embodiments can define a priority between radios given a present use case context such that a radio can be given priority over another radio based on a given use case context. The host processor can provide the coexistence policy to the radios via an interface between the host processor and the radios.

The radios can be configured to exchange state information via a separate interface between the radios. The interface between the radios can be a higher speed interface, which can facilitate real time exchange of state information between the radios. The state information can, for example, be indicative of interference conditions experienced by a radio, operating state information indicative of whether a radio is transmitting or receiving data during a given time period, and/or the like. In this regard, state information that can change frequently (e.g., in real time) can be exchanged between radios via an interface that can facilitate relatively high speed communication between radios. In this regard, some example embodiments partition information that can be used by a radio to make a decision for controlling radio operation to mitigate in-device interference into non-real time information that does not change relatively frequently, such as coexistence policies, and state information for the co-located radio(s) that can change frequently over time. The coexistence policies and/or other non-real time information that may not change with a great deal of regularity can accordingly be communicated between a host processor and radios via a slower speed interface(s) and/or shared interface via which other information can be communicated without clogging a higher speed, direct interface between radios.

A radio in accordance with some example embodiments can use state information received from another radio to control radio operation in accordance with the coexistence policy provided by the host processor. In this regard, a radio can have knowledge of conditions experienced by and/or activities being performed by a co-located radio based on the state information and can use this knowledge to determine whether to modify radio operation to mitigate interference with the co-located radio in accordance with the coexistence policy at a given time.

Management of interference mitigation can be partitioned into control in "real time" based on "real time" information, e.g., to address rapidly changing operating conditions, and control in "non real time" based on "non real time" information, e.g., to address slowly changing operating conditions. A host processor (e.g., application processor 302) can be aware of "high level" priorities that can affect multiple wireless subsystems in a wireless communication device 402. The host processor can formulate and communicate high level policy to each of the wireless subsystems based on the known high level priorities, e.g., for which wireless radio subsystem to prioritize transmission and/or reception of signals over other wireless radio subsystems, and on other "non real time" information, e.g., observation of configuration of various wireless subsystems, and "use cases" of sets of applications active in the wireless communication device and communicating through different wireless subsystems. Each wireless subsystem can be monitor in real time its own radio frequency signals as well as receive real time information through a real time communication interface from other wireless subsystems in the wireless communication device. A wireless subsystem can take actions to mitigate interference based on real time measurements, in response to requests or commands from the host processor, and/or in response to requests from another wireless subsystem. In some embodiments, a coexistence manager in a wireless subsystem can implement interference mitigation strategies to adjust transmit and/or receive properties of radio frequency signals emitted by and/or received by the wireless subsystem. The coexistence manager in the wireless subsystem can control wireless circuitry contained therein based on one or more of a coexistence policy from the host processor, requests and/or commands from the host processor, measured radio frequency conditions from the wireless subsystem, real time radio frequency information provided from other wireless subsystems, and requests from other wireless subsystems. Representative radio frequency information can include signal power, interference levels, error rates, packet errors, decoding errors, frequency channels, frequency bandwidths, frequency bands, etc. Each wireless subsystem can be contained in a separate integrated circuit device (chip) or several wireless subsystems can be grouped together in a single integrated circuit device. In a representative embodiment, the wireless communication device includes a cellular wireless chip and a separate combined wireless local area network and wireless personal area network chip, e.g., a cellular LTE/3G chip and a WiFi-BT chip. As different chips can be supplied by different clock sources, timing for each chip can vary, and thus a real time interface between two different wireless subsystems can benefit from calibration information to align reception of messages by one chip communicated from another chip. The host processor can provide calibration information to each wireless subsystem to align their real time communication interface communications. A coexistence manager in the host processor can monitor configurations of the multiple wireless subsystems, use of applications communicating through the multiple wireless subsystems, and performance measurement reports (e.g., link quality, performance characteristics, etc.) provided by the multiple wireless subsystems to determine when to transition one or more of the wireless subsystems from a "no wireless coexistence" state to a "wireless coexistence" state. While in a "wireless coexistence" state, a wireless subsystem can execute a set of coexistence algorithms to mitigate interference for signals emitted by and/or received by the wireless subsystem. As described further herein, events monitored by the host processor and/or by a wireless subsystem can result in various actions undertaken and/or requested and/or commanded by the host processor and/or by one or more of the wireless subsystems. The host processor can establish a set of link quality monitoring conditions for each wireless subsystem, and when a link quality for a wireless subsystem fails a set of link quality conditions, the host processor can take action to mitigate interference that may be affecting the performance of link quality for the affected wireless subsystem. Another wireless subsystem can be considered an "aggressor" to the "victim" wireless subsystem experiencing link quality failure. (Note, link quality failure can indicate a change in performance with respect to one or more threshold values communicated by the host processor and need not refer to radio link failure.) The host processor can request and/or command actions to reduce interference generated by the "aggressor" wireless subsystem, e.g., by changing any of several different radio frequency properties directly (e.g., by changing RF transmission parameters) and/or indirectly (e.g., by changing data requirements and/or radio resource requests). The host processor can also request and/or command actions from the "victim" wireless subsystem, e.g., by changing radio frequency properties for signal reception and/or data requirements for communication through the "victim" wireless subsystem. Each wireless subsystem can react to requests and/or commands to alter its radio frequency properties and/or data requirements based on information available to the wireless subsystem, e.g., operating conditions, link quality, active procedures, operating states, state changes, etc. A wireless subsystem can seek to balance mitigation of interference into other wireless subsystems against its own link quality and stability, e.g., to ensure stability and proper completion of procedures ongoing by and/or through the wireless subsystem. Each wireless subsystem monitors its own condition in real time (or near real time) and has more information available in real time about its own condition than the host processor. The wireless subsystem can inform (or respond to requests from) the host processor whether it adheres to requests and/or commands to adjust radio frequency transmissions and/or reception. A wireless subsystem can ignore and/or delay changes to radio frequency transmissions and/or reception in order to ensure radio link failure for communication by the wireless subsystem is not affected, e.g., when a radio link has a high path loss, the wireless subsystem can continue to use a higher transmit power level to secure use of the radio link. A wireless subsystem can also ignore and/or delay transmit power reduction (or other radio frequency changes) to maintain link stability, e.g., during a critical processing state or procedure, such as a radio resource control (RRC) or random access channel (RACH) procedure, or other signaling procedure that can affect a radio link. Additional details of methods and apparatus for mitigating interference in a wireless communication device that includes multiple wireless subsystems is further described hereinbelow.

Figure 10:
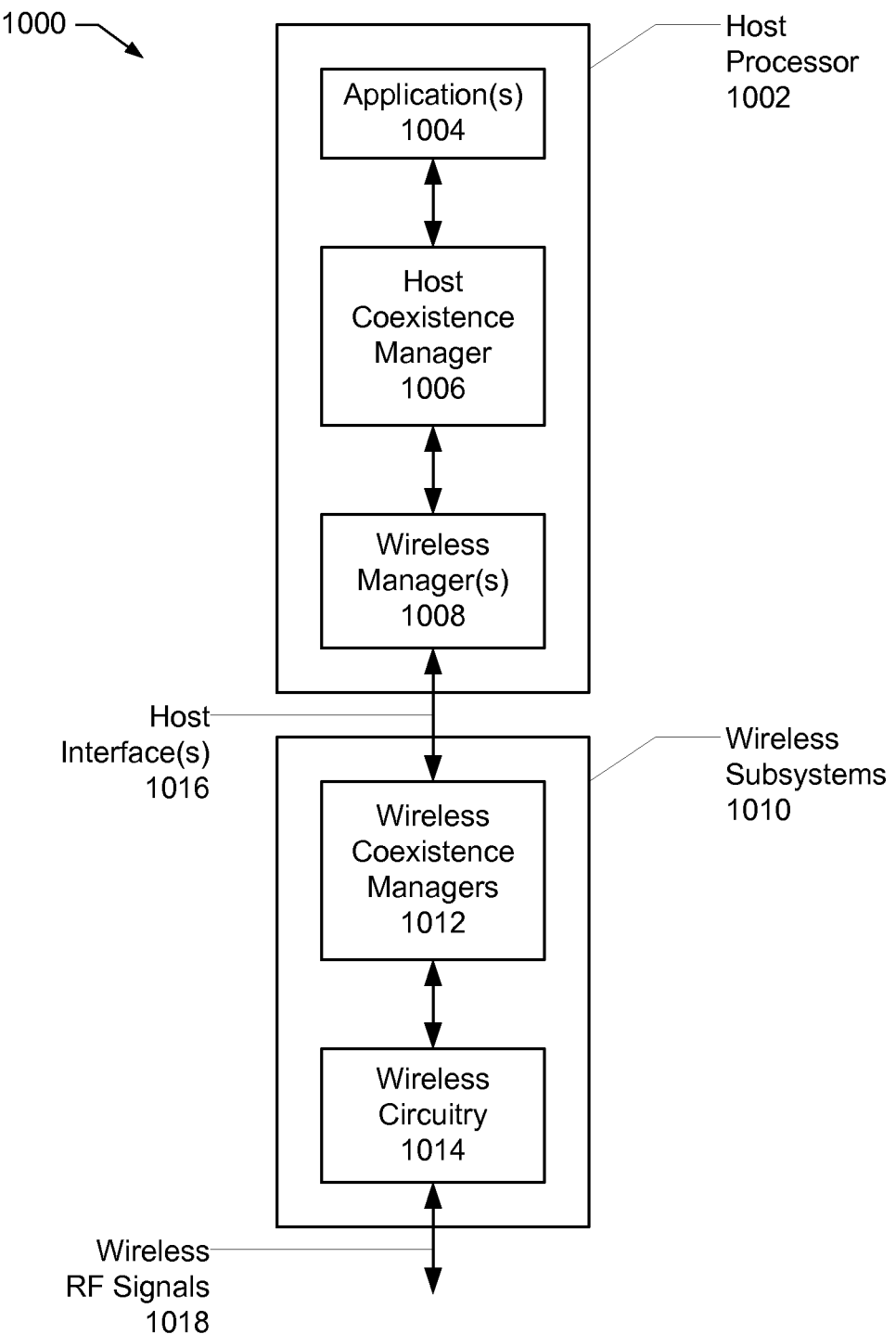
FIG. 10 illustrates a representative block diagram for a set of components in a wireless communication device in accordance with some embodiments.

FIG. 10 illustrates a representative block diagram 1000 for a set of components in a wireless communication device 402 in accordance with some embodiments. The set of components illustrated in FIG. 10 can encompass the architecture 300 illustrated in FIG. 3 in some embodiments. The wireless communication device 402 can include a host processor 1002 and a plurality of wireless subsystems 1010. The host processor 1002 can couple to the plurality of wireless subsystems 1010 through one or more host interfaces 1016. A representative host interface 1016 can include the non-real-time interface 338 described hereinabove that couples a plurality of radio managers 314-320 operating in the host processor 1002 to a plurality of wireless subsystems (radios) 304-308. The host processor can, in some embodiments, perform operations of an applications processor in the wireless communication device 402, e.g., executing one or more applications 1004 thereon. The applications 1004 can generate signaling commands and data packets to communicate over one or more wireless networks using one or more of the wireless subsystems 1010. The applications 1004 can also receive signaling commands, e.g., from a host coexistence manager 1006 or other control functions operational in the host processor 1002, and consume data packets received through the one or more wireless subsystems 1010. The host coexistence manager 1006 in the host processor 1002 can obtain configurations of one or more wireless subsystems 1010 and can evaluate whether the configurations indicate a potential or actual coexistence interference condition between two or more of the wireless subsystems 1010. In some embodiments, the host coexistence manager 1006 can determine modifications to one or more parameters for the configurations of one or more of the wireless subsystems 1010 to mitigate interference between them. The host coexistence manager 1006 in cooperation with one or more wireless managers 1008 operational in the host processor 1002 can provide configuration parameters to the one or more wireless subsystems 1010 in order to monitor link quality and/or to manage interference between each of the wireless subsystems 1010. One or more wireless coexistence managers 1012 operational in the plurality of wireless subsystems 1010 can receive information, requests, and/or commands from the host coexistence manager 1006, e.g., via the wireless managers 1008, and can adjust operational parameters of wireless circuitry 1014 in their respective wireless subsystems 1010 to balance link quality for communications through the wireless subsystems 1010. In some embodiments, the host processor defines a coexistence policy including coexistence parameters, which are provided to the wireless subsystems 1010. The host interface 1016 between the wireless subsystems 1010 and the host processor 1002 can operate in "non-real-time" relative to changing operational conditions of the wireless radio frequency (RF) signals 1018 transmitted and received by the wireless circuitry 1014 of the wireless subsystems 1010. In some embodiments, the wireless subsystems 1010 are interconnected to each other (or to a subset of each other) through one or more "real-time" interfaces that can provide information on an operational state and/or link quality conditions in "real time" to each of the wireless subsystems 1010 for wireless RF signals 1018 received by the wireless subsystems 1010. In some embodiments, a wireless subsystem 1010 monitors wireless RF signals 1018 received in real time by the wireless subsystem 1010, e.g., based on link quality parameters provided by the host processor 1002, and can provide information about the link quality to the host processor 1002 in "non-real-time" as well as to other wireless subsystems 1010 in "real time." Thus, the wireless subsystems 1010 can exchange real time wireless radio frequency signal and configuration information between themselves and can provide "summary" information in non-real-time to the host processor. Each of the wireless subsystems 1010 can undertake various actions to mitigate interference of wireless RF signals 1018 transmitted by the wireless subsystems 1010 that can be received by other wireless subsystems 1010 in the wireless communication device 402. A wireless subsystem 1010 can receive requests to modify wireless RF signals 1018 from the host processor 1002, e.g., from the host coexistence manager 1006 via a wireless manager 1008, and from another wireless subsystem 1010, e.g., from another wireless coexistence manager 1012 therein. The wireless subsystem 1010 receiving the requests can determine an appropriate set of actions to undertake that balances link quality, performance, and/or stability for communication of wireless RF signals 1018 for itself and mitigating interference into other wireless subsystems 1010 of the wireless communication device 402.

Figure 11:
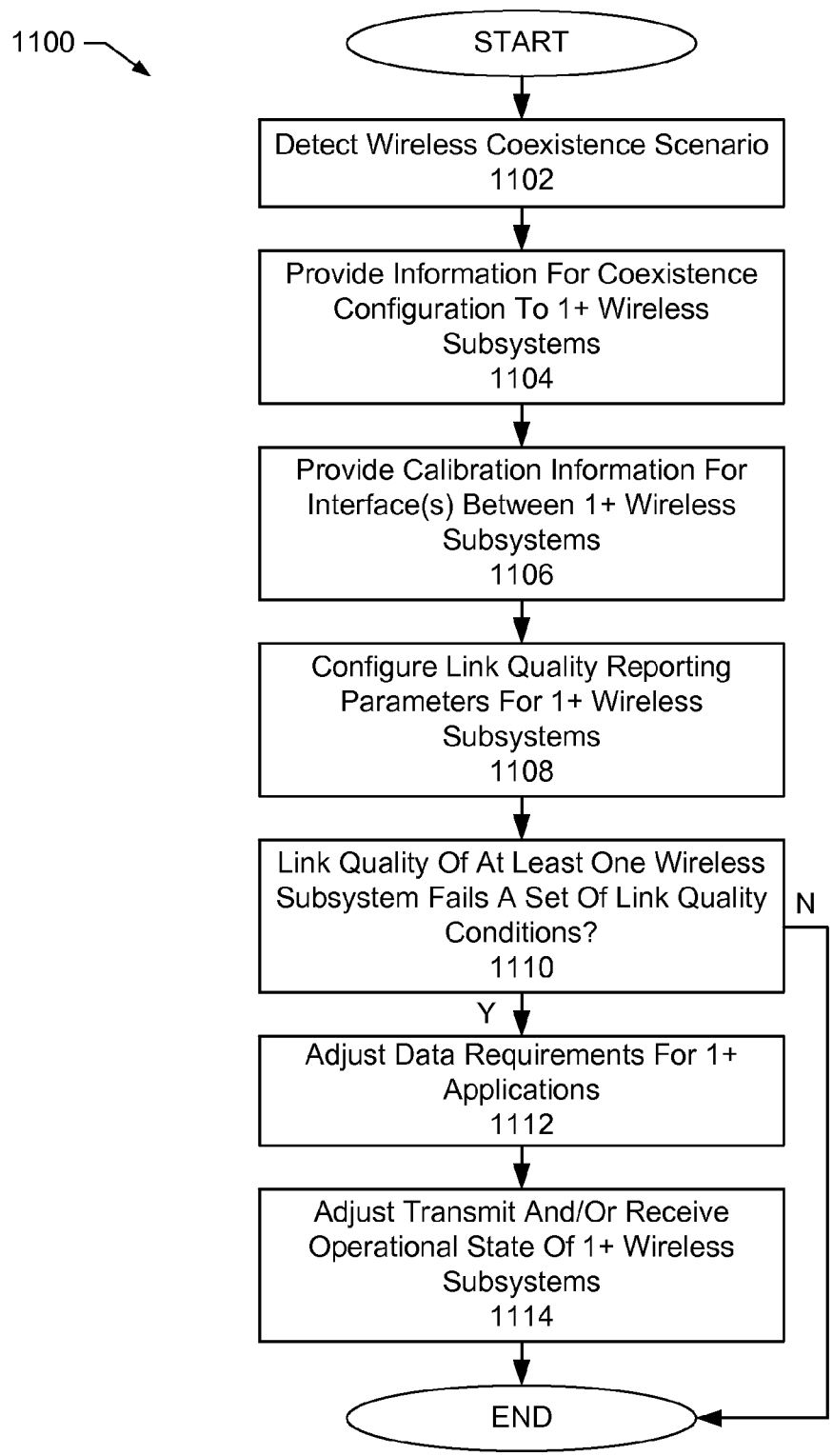
FIG. 11 illustrates a representative method that can be performed by components of the wireless communication device to mitigate interference of wireless radio frequency signals between multiple wireless subsystems of the wireless communication device, in accordance with some embodiments.

FIG. 11 illustrates a representative method 1100 that can be performed by components of the wireless communication device 402, e.g., by the host processor 1002, to mitigate interference of wireless RF signals 1018 between multiple wireless subsystems 1010 of the wireless communication device 402, in accordance with some embodiments. In step 1102, the host processor 1002 can detect a wireless coexistence scenario in which configurations of two or more wireless subsystems 1010 can potentially or actually result in wireless RF interference of wireless RF signals 1018 communicated therefrom. The wireless coexistence scenario can comprise a set of wireless subsystem configurations for a plurality of the wireless subsystems 1010 of the wireless communication device 402. As described herein, wireless RF signals 1018 transmitted by one wireless subsystem 1010 can interfere with wireless RF signals 1018 received by another wireless subsystem 1010, e.g., due to higher order harmonics, due to insufficient (and/or impractical) levels of antenna isolation, due to improved sensitivity of wireless RF receivers, and/or other wireless RF operating conditions. In step 1104, the host processor 1002 can provide information about the configurations of one or more of the wireless subsystems 1010 to other of the multiple wireless subsystems 1010 of the wireless communication device 402. In a representative embodiment, the wireless communication device 402 includes two distinct wireless subsystems 1010, and the host processor 1002 provides configuration information to each wireless subsystem 1010 to inform them of the configuration of the corresponding other wireless subsystem 1010 in the wireless communication device 402. In some embodiments, the configuration of the wireless subsystem 1010 can include one or more different wireless RF configuration parameters used by the wireless subsystem 1010, e.g., an RF band, an RF channel, an RF bandwidth, a FDD and/or TDD configuration, a frame format, etc. In some embodiments, the wireless subsystems 1010 are interconnected to each other by a real time communication interface. In step 1106, the host processor 1002 can provide calibration information for the real time communication interface between the wireless subsystems 1010. In a representative embodiment, the calibration information includes an offset and/or a jitter setting for messages communicated between the wireless subsystems 1010 over the real time communication interface. In some embodiments, the calibration information provided to each wireless subsystem 1010 is specific to reception of signals over the real time communication interface from another particular wireless subsystem 1010. In step 1108, the host processor 1002 configures link quality reporting by one or more wireless subsystems 1010, e.g., by providing link quality reporting parameters to the one or more wireless subsystems 1010. In some embodiments, the link quality reporting parameters determine, at least in part, under what conditions the wireless subsystem 1010 measures and reports link quality to the host processor 1002 and/or to another wireless subsystem 1010. In step 1110, the host processor 1002 determines whether a link quality of at least one of the wireless subsystems fails a set of link quality conditions. When none of the wireless subsystems fail the set of link quality of conditions, the method 1100 ends. When at least one of the wireless subsystems fails the set of link quality conditions, the method continues in step 112, and the host processor 1002 adjusts data requirements for one or more applications of the wireless communication device 402.

In some embodiments, the host processor 1002 determines wireless RF signals 1018 of a first wireless subsystem 1010 interferences with reception of wireless RF signals 1018 by a second wireless subsystem 1010, and the host processor 1002 adjusts the data requirements of one or more applications that communicate data packets through the first wireless subsystem 1010, e.g., to reduce transmission levels and/or transmission time periods for wireless RF signals 1018 emitted by the first wireless subsystem 1010. The host processor 1002 can also adjust the data requirements of one or more applications that receive data packets through the second wireless subsystem 1010. In step 1114, the host processor 1002 provides requests and/or commands to one or more wireless subsystems 1010 to adjust transmit and/or receive operational states in order to mitigate interference between the wireless subsystems 1010 of the wireless communication device 402. In some embodiments, the requests and/or commands can determine on what frequencies, in what frequency bands, at what transmit power levels, and/or during which time periods, transmissions or reception of wireless RF signals 1018 by the wireless subsystems 1010 occurs.

Figure 12:
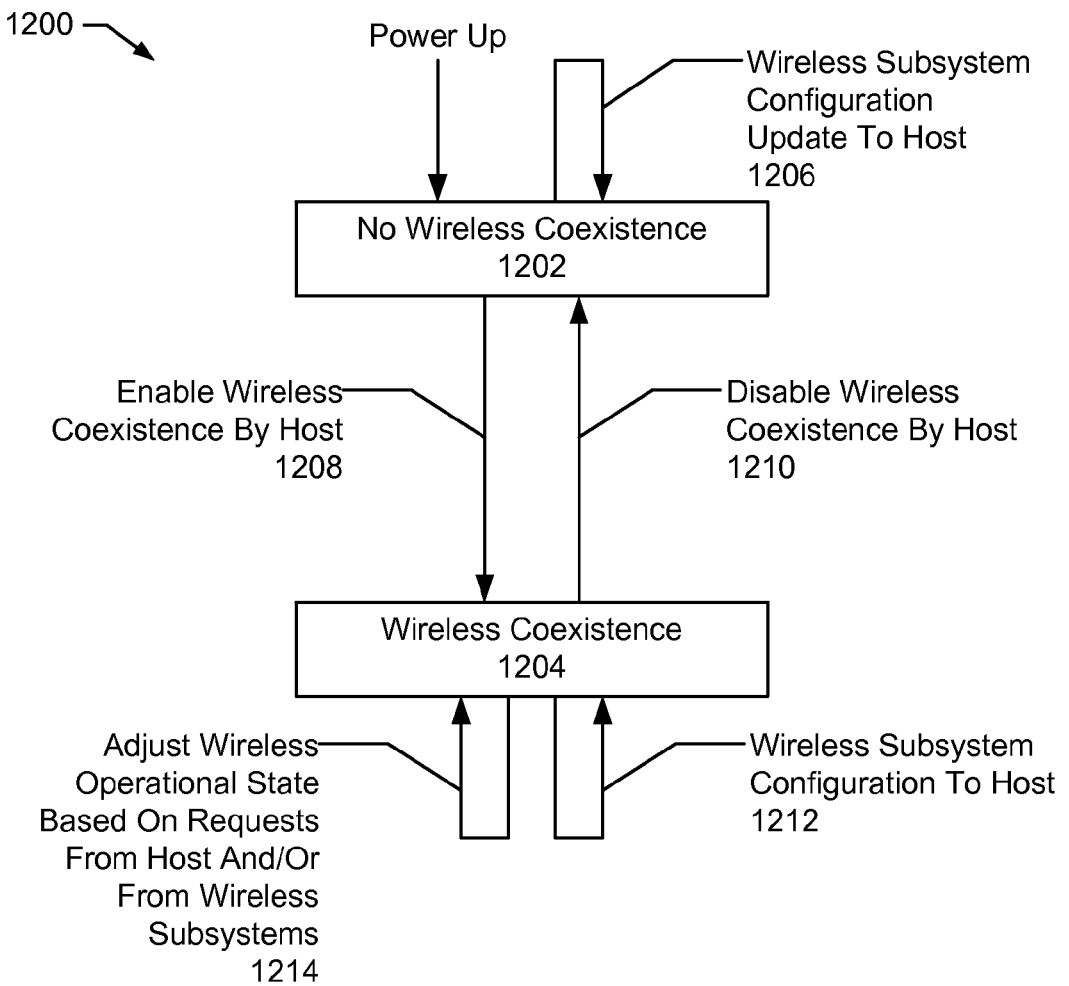
FIG. 12 illustrates a state diagram 1200 which can apply to a wireless subsystem 1010 in the wireless communication device 402, in accordance with some embodiments.

FIG. 12 illustrates a state diagram 1200 which can apply to a wireless subsystem 1010 in the wireless communication device 402. Upon power up of the wireless communication device 402, each wireless subsystem 1010 can initialize to a "no wireless coexistence" state 1202, in which transmission and/or reception of wireless RF signals 1018 by a particular wireless subsystem 1010 can operate in accordance with requirements for the particular wireless subsystem 1010. Each wireless subsystem 1010 can provide configuration information of its operating state to the host processor 1002, e.g., an initial configuration and updates when configuration changes. The host processor 1002 can monitor the collection of operational configurations of the various wireless subsystems 1010 to determine whether a coexistence scenario can exist, e.g., a potential or actual interference condition can exist between two of the wireless subsystems 1010. The host processor 1002 can enable a coexistence state of a wireless subsystem 1010 by sending one or more commands to the wireless subsystem 1010 to transition the state of the wireless subsystem 1010 from the "no wireless coexistence" state 1202 to the "wireless coexistence" state 1204. The transition indicated by the state change 1208 in FIG. 12. While in the "wireless coexistence" state 1204, the wireless subsystem 1010 can receive request and/or commands from the host processor 1002 and/or from another wireless subsystem 1010 that can seek to mitigate interference between the wireless subsystems 1010. The wireless subsystem 1010 can adjust its wireless operational state (as indicated by the transition 1214) based on one or more requests and/or commands received from the host processor 1002 and/or from the another wireless subsystem 1010. The wireless subsystem 1010 can also provide information about its configuration to the host processor 1002 whenever a configuration change occurs, as indicated by the transition 1212. The wireless subsystem 1010 can remain in the "wireless coexistence" state 1204 until provided a command from the host processor 1002 to disable wireless coexistence, following which the wireless subsystem 1010 can transition to the "no wireless coexistence" state 1202, as indicated by the state transition 1210. While in the "wireless coexistence" state 1204, a wireless subsystem 1010 can communicate with the host processor 1002 and with another wireless subsystem 1010 in order to monitor wireless RF link quality and/or performance and adjust operational states and/or parameters in order to mitigate interference of wireless RF signals 1018 between them. The wireless subsystem 1010 can balance wireless RF performance of itself against requirements for wireless RF performance of one or more other wireless subsystems 1010 of the wireless communication device 402. The host processor 402, and the set of wireless subsystems 1010, can operate in concert to execute wireless coexistence algorithms in order to balance the overall performance of the wireless subsystems 1010 of the wireless communication device 402.

FIG. 13 illustrates a table 1300 summarizing a set of messages (e.g., requests and/or commands) that the host processor 1002 can send to two different wireless subsystems 1010 of the wireless communication device 402 when transitioning from the "no wireless coexistence" state 1202 to the "wireless coexistence" state 1204. In a representative embodiment, the wireless communication device 402 includes a first wireless subsystem 1010 that operates in accordance with a wireless cellular protocol and a second wireless subsystem 1010 that operates in accordance with a combination of a wireless local area network (WLAN) protocol, e.g., a WiFi protocol, and a wireless personal area network (WPAN) protocol, e.g., a Bluetooth (BT) protocol. In some embodiments, the wireless communication device 402 includes a cellular wireless subsystem 1010 and a combined WiFi-BT wireless subsystem 1010. The host processor 1002 can obtain configurations from the cellular wireless subsystem 1010 and from the WiFi-BT wireless subsystem 1010, and based on the obtained configurations the host processor 1002 can determine that a specific combination of cellular and WiFi-BT configurations for the wireless subsystems 1010 can cause a wireless RF coexistence problem, e.g., interference between the wireless subsystems 1010. The host processor 1002 can send one or more messages to each of the cellular wireless subsystem 1010 and the WiFi-BT wireless subsystem 1010 to initialize the wireless subsystems 1010 into respective "wireless coexistence" states 1204. The host processor 1002 can instruct the cellular wireless subsystem 1010 to transition to the "wireless coexistence" state 1204, and can send messages to configure parameters of the "wireless coexistence" state 1204 for the cellular wireless subsystem 1010. The configuration parameters can include a set of values for thresholds used in the "wireless coexistence" state 1204 and a set of transmit power limits. In some embodiments, the threshold values include values for one or more of an RF link quality, an RF link path loss, and a number of radio bearers. The cellular wireless subsystem 1010 can use the threshold values to determine when and/or whether to adjust transmit and or receive operational states of the cellular wireless subsystem 1010, in some embodiments. The host processor 1002 can also provide calibration parameters for a real time communication interface that couples the cellular wireless subsystem 1010 to the WiFi-BT wireless subsystem 1010. In some embodiments, the calibration parameters can include an offset and/or a jitter setting for reception of messages through the real time communication interface by the cellular wireless subsystem 1010. The host processor 1002 can also communicate a set of parameters that can be used for configuration of cellular link quality monitoring and reporting by the cellular wireless subsystem 1010.

The host processor 1002 can also configure the WiFi-BT wireless subsystem 1010 to enter the "wireless coexistence" state 1204. The host processor 1002 can communicate information about a configuration of the cellular wireless subsystem 1010 to the WiFi-BT wireless subsystem 1010. In some embodiments, the cellular wireless subsystem 1010 configuration can include a frequency band, a frequency channel, a frequency bandwidth, an FDD and/or TDD configuration, an uplink/downlink configuration, a frame format, and/or a special sub-frame format used by the cellular wireless subsystem 1010. In some embodiments, the WiFi-BT wireless subsystem 1010 can use the information provided about the configuration of the cellular wireless subsystem 1010 to modify transmission and/or reception of wireless RF signals 1018 in order to mitigate interference with the cellular wireless subsystem 1010. The host processor 1002 can also provide calibration parameters for a real time communication interface that couples the cellular wireless subsystem 1010 to the WiFi-BT wireless subsystem 1010. In some embodiments, the calibration parameters can include an offset and/or a jitter setting for reception of messages through the real time communication interface by the WiFi-BT wireless subsystem 1010. The host processor 1002 can also communicate a set of parameters that can be used for configuration of RF link quality monitoring and reporting for the WiFi and/or BT wireless RF links by the WiFi-BT wireless subsystem 1010 to the host processor 1002. The host processor 1002 can provide a BT adaptive frequency hopping (AFH) mask to the WiFi-BT wireless subsystem 1010, and the BT AFH mask, in some embodiments, can be based on a particular configuration of the wireless cellular subsystem 1010. For example, the BT AFH mask can account for wireless interference of wireless RF signals 1018 based on a knowledge of the cellular wireless subsystem 1010 configuration.

FIG. 14 illustrates a table 1400 that summarizes a set of actions that the host processor 1002 can undertake to mitigate interference between wireless subsystems 1010 of the wireless communication device 402. Table 1400 outlines actions for the host processor 1002 when the cellular wireless subsystem 1010 is identified as an "aggressor" and the WiFi-BT wireless subsystem 1010 as a "victim." The host processor 1002 can receive information about link quality for wireless RF links of the WiFi-BT wireless subsystem 1010, e.g., when the WiFi-BT wireless subsystem 1010 is in the "wireless coexistence" state 1204. The host processor 1002 can determine when a link quality of a wireless RF link of the WiFi-BT wireless subsystem 1010 fails a set of link quality conditions, e.g., based on a measurement report provided by the WiFi-BT wireless subsystem 1010 to the host processor 1002. In an embodiment, a link quality metric for an RF wireless link of the WiFi-BT wireless subsystem 1010 can fall below a link quality threshold. When the WiFi-BT wireless subsystem 1010 link quality fails the set of link quality conditions, the host processor 1002 can undertake actions to improve the link quality, e.g., by mitigating interference of wireless RF signals 1018 from the "aggressor" cellular wireless subsystem 1010 into the "victim" WiFi-BT wireless subsystem 1010. The host processor 1002 can adjust data requirements for one or more applications that communicate over the wireless RF links, e.g. by reducing real time codec rates for one or more applications, by reducing streaming transfer rates used by one or more applications. By reducing the codec rate and/or the streaming transfer rate, the host processor 1002 can reduce the data requirements for transmission by the cellular wireless subsystem 1010 and/or reduce the data requirements for reception by the WiFi-BT wireless subsystem 1010. In some embodiments, the host processor 1002 can adjust data rates of one or more applications for which data packets are communicated over the cellular wireless subsystem 1010, thereby reducing an active data rate of the cellular wireless subsystem 1010. In some embodiments, a reduction in a data rate of the cellular wireless subsystem 1010 can reduce the amount of power, the frequency of transmissions, an amount of active transmission time periods, or other wireless RF transmission properties that can result in less interference of wireless RF signals 1018 from the cellular wireless subsystem 1010 into the WiFi-BT wireless subsystem 1010. The host processor 1002 can reduce directly or indirectly an amount of cellular uplink (UL) data traffic transmitted by the cellular wireless subsystem 1010, e.g., by throttling UL data traffic provided by one or more applications to the cellular wireless subsystem 1010. In some embodiments, the host processor 1002 communicates one or more requests to the cellular wireless subsystem 1010 to adjust UL transmissions, e.g., change an uplink data rate, a period of time for UL transmissions, a number of UL radio resource requests, and/or a value for a buffer status report communicated by the cellular wireless subsystem to a corresponding access network subsystem. In some embodiments, the host processor 1002 communicates one or more requests to the cellular wireless subsystem 1010 to adjust UL transmit power, e.g., to reduce a transmit power level and/or active transmit power time periods. In some embodiments, the host processor 1002 configures the wireless cellular subsystem 1010 to report link quality metric information to the host processor 1002 periodically, e.g., to provide for monitoring of performance of wireless RF links of the cellular wireless subsystem 1010. The host processor 1002 can respond to information provided in a cellular wireless system 1010 link quality report by adjusting (directly or indirectly) UL transmissions (e.g., transmit power levels) when the wireless cellular UL link quality changes. Thus, the host processor 1002 can monitor effects of adjustments to the cellular wireless subsystem 1010 in order to balance performance of wireless RF links of the WiFi-BT wireless subsystem 1010 with performance of wireless RF links of the cellular wireless subsystem 1010. The host processor 1002 can also monitor whether the cellular wireless subsystem 1010 actually limits its UL transmit power in response to requests and/or commands from the host processor 1002. When the host processor 1002 determines that the cellular wireless subsystem 1010 actually limits its UL transmit power, the host processor 1002 can configure the cellular wireless subsystem 1010 to initiate periodic cellular wireless link quality reporting to the host processor 1002 in order to monitor the UL link quality when the UL transmit power is limited. The host processor 1002 can adaptively adjust the cellular wireless subsystem 1010 UL transmit power to balance performance of the cellular wireless subsystem 1010 RF wireless links against the performance of the WiFi-BT wireless subsystem 1010 RF wireless links. The host processor 1002 can also determine that the cellular wireless subsystem is not limited the UL transmit power in response to a request and/or command to do so by the host processor 1002. The host processor 1002 can, in some embodiments, in response, adjust data requirements for one or more applications (e.g., as described hereinabove). The host processor 1002 can throttle UL data traffic of the cellular wireless subsystem 1010 and/or request that the cellular wireless subsystem send reduced buffer status report (BSR) values, e.g., to request fewer UL radio resources to reduce UL data transmissions. Each of the wireless subsystems 1010 of the wireless communication device 402 can communicate configuration information to the host processor 1002, and when a specific combination of cellular wireless subsystem 1010 and WiFi-BT wireless subsystem 1010 configurations does not indicate a potential or an actual wireless coexistence problem, the host processor 1002 can send messages to the cellular wireless subsystem 1010 and to the WiFi-BT wireless subsystem 1010 to disable the "wireless coexistence" state 1204 and thereby return to the "no wireless coexistence" state 1202.

FIG. 15 illustrates a table 1500 that summarizes a set of actions that the host processor 1002 can undertake to mitigate interference between wireless subsystems 1010 of the wireless communication device 402. Table 1500 outlines actions for the host processor 1002 when the WiFi-BT wireless subsystem 1010 is identified as an "aggressor" and the cellular wireless subsystem 1010 as a "victim." The host processor 1002 can receive information about link quality for wireless RF links of the cellular wireless subsystem 1010, e.g., when the cellular wireless subsystem 1010 is in the "wireless coexistence" state 1204. The host processor 1002 can determine when a link quality of a wireless RF link of the cellular wireless subsystem 1010 fails a set of link quality conditions, e.g., based on a measurement report provided by the cellular wireless subsystem 1010 to the host processor 1002. In an embodiment, a link quality metric for an RF wireless link of the cellular wireless subsystem 1010 can fall below a link quality threshold. When the cellular wireless subsystem 1010 link quality fails the set of link quality conditions, the host processor 1002 can undertake actions to improve the link quality, e.g., by mitigating interference of wireless RF signals 1018 from the "aggressor" WiFi-BT wireless subsystem 1010 into the "victim" cellular wireless subsystem 1010. The host processor 1002 can adjust data requirements for one or more applications that communicate over the wireless RF links, e.g. by reducing real time codec rates for one or more applications, by reducing streaming transfer rates used by one or more applications. By reducing the codec rate and/or the streaming transfer rate, the host processor 1002 can reduce the data requirements for transmission by the WiFi-BT wireless subsystem 1010 and/or reduce the data requirements for reception by the cellular wireless subsystem 1010. In some embodiments, the host processor 1002 can adjust data rates of one or more applications for which data packets are communicated over the WiFi-BT wireless subsystem 1010, thereby reducing an active data rate of the WiFi-BT wireless subsystem 1010. In some embodiments, a reduction in a data rate of the WiFi-BT wireless subsystem 1010 can reduce the amount of power, the frequency of transmissions, an amount of active transmission time periods, or other wireless RF transmission properties that can result in less interference of wireless RF signals 1018 from the WiFi-BT wireless subsystem 1010 into the cellular wireless subsystem 1010. In some embodiments, the host processor 1002 communicates one or more requests to the WiFi-BT wireless subsystem 1010 to adjust transmit power, e.g., to reduce a transmit power level and/or active transmit power time periods. In some embodiments, the host processor 1002 requests that the BT transceiver of the WiFi-BT wireless subsystem 1010 use a new (or adapt an existing) AFH mask. In some embodiments, the host processor 1002 requests that the WiFi transceiver of the WiFi-BT wireless subsystem 1010 change an RF channel on which the WiFi transceiver operates, e.g., when operating in a peer-to-peer (P2P) or access point (AP) mode. In some embodiments, the host processor 1002 configures the WiFi-BT wireless subsystem 1010 to report link quality metric information to the host processor 1002 periodically, e.g., to provide for monitoring of performance of wireless RF links of the WiFi-BT wireless subsystem 1010. The host processor 1002 can respond to information provided in a WiFi-BT wireless system 1010 link quality report by adjusting (directly or indirectly) transmissions (e.g., transmit power levels) when the wireless WiFi-BT link quality changes. Thus, the host processor 1002 can monitor effects of adjustments to the WiFi-BT wireless subsystem 1010 in order to balance performance of wireless RF links of the cellular wireless subsystem 1010 with performance of wireless RF links of the WiFi-BT wireless subsystem 1010. The host processor 1002 can also monitor whether the WiFi-BT wireless subsystem 1010 actually limits its transmit power in response to requests and/or commands from the host processor 1002. When the host processor 1002 determines that the WiFi-BT wireless subsystem 1010 actually limits its transmit power, the host processor 1002 can configure the WiFi-BT wireless subsystem 1010 to initiate periodic WiFi-BT link quality reporting to the host processor 1002 in order to monitor the link quality when the transmit power is limited. The host processor 1002 can adaptively adjust the WiFi-BT wireless subsystem 1010 transmit power to balance performance of the cellular wireless subsystem 1010 RF wireless links against the performance of the WiFi-BT wireless subsystem 1010 RF wireless links. The host processor 1002 can also determine that the WiFi-BT wireless subsystem is not limited the transmit power in response to a request and/or command to do so by the host processor 1002. The host processor 1002 can, in some embodiments, in response, adjust data requirements for one or more applications that communicate over the WiFi-BT wireless RF links (e.g., as described hereinabove). The host processor 1002 can reduce WiFi-BT data traffic of the WiFi-BT wireless subsystem 1010. The WiFi-BT wireless subsystem 1010 can communicate configuration information to the host processor 1002 while in the "wireless coexistence" state 1204. When the configuration of the WiFi-BT wireless subsystem 1010 changes, e.g., when the WiFi operational mode changes from a "station" mode to a "peer to peer" and/or an "access point" mode, the host processor can request that the WiFi-BT wireless subsystem change a frequency channel used for WiFi transmissions. Similarly, when the BT operational mode changes from a "slave" mode to a "master" mode, the host processor 1002 can request that the WiFi-BT wireless subsystem adjust BT timing to align transmission based on a time-division duplexing (TDD) configuration of the cellular wireless subsystem 1010. Thus, the BT transmissions can be scheduled to reduce interference to reception of TDD cellular reception. Each of the wireless subsystems 1010 of the wireless communication device 402 can communicate configuration information to the host processor 1002, and when a specific combination of cellular wireless subsystem 1010 and WiFi-BT wireless subsystem 1010 configurations does not indicate a potential or an actual wireless coexistence problem, the host processor 1002 can send messages to the cellular wireless subsystem 1010 and to the WiFi-BT wireless subsystem 1010 to disable the "wireless coexistence" state 1204 and thereby return to the "no wireless coexistence" state 1202.

FIG. 16 illustrates a table 1600 that summarizes actions that the cellular wireless subsystem 1010 can undertake based on one or more events when the cellular wireless subsystem 1010 is an "aggressor" and the WiFi-BT wireless subsystem is a "victim." The cellular wireless subsystem 1010 can provide radio frequency (RF) configuration updates to the host processor 1002. The RF configuration changes an include updates to a radio access technology (RAT) in use by the cellular wireless subsystem 1010, e.g., following in inter-RAT handover, changes to a set of radio frequencies in use, a TDD configuration, and/or other RF parameters that can affect RF transmission properties and therefore wireless RF interference into the collocated WiFI-BT wireless subsystem 1010. The cellular wireless subsystem 1010 can provide wireless configuration updates to the host processor 1002 whether in the "no wireless coexistence" state 1202 or the "wireless coexistence" state 1204. The host processor 1102 can send one or more messages to the cellular wireless subsystem 1010 to enter the "wireless coexistence" state 1204. The cellular wireless subsystem 1010 can, in response, obtain one or more configuration parameters to use while in the "wireless coexistence" state 1204 from the host processor 1002. The cellular wireless subsystem 1010 can configure itself for monitoring and reporting of link quality metrics to the host processor 1002. The cellular wireless subsystem 1010 can calibrate a real-time communication interface that couples to the WiFi-BT wireless subsystem 1010, e.g., based on one or more calibration parameters (offset, jitter) provided by the host processor 1002. While in the "wireless coexistence" state 1204, the cellular wireless subsystem 1010 can account for a receive priority ("RX Priority") signal received from the WiFi-BT wireless subsystem 1010 and/or from the host processor 1002. In some embodiments, the "RX Priority" signal can indicate a priority for reception by the WiFi-BT wireless subsystem 1010 over the cellular wireless subsystem 1010. In some embodiments, the "RX Priority" signal can indicate a period of time to prioritize reception by the WiFi-BT wireless subsystem 1010 over the cellular wireless subsystem 1010. While in the "wireless coexistence" state 1204, the cellular wireless subsystem 1010 can receive requests from the host processor 1002 and/or from the WiFi-BT wireless subsystem 1010. Representative requests can include requests to adjust data rates, adjust transmit power, start and/or stop link quality reporting. The cellular wireless subsystem 1010 can conditionally undertake certain actions in response to requests from the host processor 1002 and/or from the WiFi-BT wireless subsystem 1010. Some actions by the cellular wireless subsystem 1010 can depend on a link state and/or operating state of the cellular wireless subsystem 1010. In some embodiments, the cellular wireless subsystem 1010 can determine a link quality for one or more RF links used by the cellular wireless subsystem 1010 and can undertake all, a portion, and/or none of the requested actions based on the link quality and/or state of the cellular wireless subsystem 1010. In some embodiments, the cellular wireless subsystem 1010 can limit transmit power and/or limit UL transmissions when UL link quality permits. In some embodiments, the cellular wireless subsystem 1010 can compare a link quality, a link path loss value, and/or a number of active radio bearers to a set of thresholds to determine whether to adjust UL transmit power levels and/or limit UL transmissions. In some embodiments, when the path loss is less than particular threshold value (which can be provided by the host processor 1002) and the number of active radio bearers is greater than another particular threshold value (which can also be provided by the host processor 1002), the cellular wireless subsystem 1010 can adjust UL transmit power levels and/or limit UL transmissions when requested by the host processor 1002 and/or by the WiFi-BT wireless subsystem 1010. The cellular wireless subsystem 1010 can use measurements of link quality, link path loss, and/or number of active radio bearers to evaluate cellular link performance in order to estimate whether a change in UL transmit properties (e.g., transmit power level) can impact UL performance. In some embodiments, the cellular wireless subsystem 1010 can delay and/or reduce cellular UL data resource requests, e.g., by changing values in one or more buffer status reports and/or by limiting scheduling requests provided to a wireless access subsystem of a cellular wireless network to which the cellular wireless subsystem 1010 is connected and/or associated. The cellular wireless subsystem 1010 can also monitor its own state and/or active procedures and can determine whether to honor requests for limiting data and/or power based on the current state and/or on currently active procedures. The cellular wireless subsystem 1010 can delay and/or deny changes to transmit power and/or data rates during a radio resource control (RRC) state change and/or during a change of a transmit or receive state of the cellular wireless subsystem 1010. The cellular wireless subsystem 1010 can seek to ensure that its own connection is not lost and/or quality affected by undertaking any wireless coexistence actions. The cellular wireless subsystem 1010 can delay certain actions until after certain procedures are complete, e.g., after RRC and/or Tx/Rx state changes have completed. Based on configuration by the host processor 1002, the cellular wireless subsystem 1010 can measure and report cellular link quality metrics to the host processor 1002, e.g., based on one or more reporting events and/or based on a request for periodic reporting. The wireless cellular subsystem 1010 can provide information about the cellular wireless subsystem 1010 state and/or cellular wireless subsystem 1010 activity to the WiFi-BT wireless subsystem 1010, e.g., when a cellular state changes. Thus, the cellular wireless subsystem 1010 can communicate information about its own configuration directly to the WiFi-BT wireless subsystem 1010. In some embodiments, the cellular wireless subsystem 1010 can communicate transmit and/or receive timing information to the WiFi-BT wireless subsystem 1010. In some embodiments, the cellular wireless subsystem 1010 can communicate transmission modes (e.g., sleep, dynamic reception, idle) to the WiFi-BT wireless subsystem 1010. In some embodiments, the cellular wireless subsystem 1010 can provide information about "safe to receive" and/or "not safe to receive" time periods to the WiFi-BT wireless subsystem 1010. The wireless cellular subsystem 1010 can be interconnected to the WiFi-BT wireless subsystem by a real time communication interface. A representative interface is the WCI2 standardized interface, and the cellular wireless subsystem 1010 can communicate one or more standard WCI2 messages to the WiFi-BT wireless subsystem 1010 over the WCI2 communication interface. Representative messages include a Type 0 Tx/Rx state message and a Type 3 cellular activity message. Additional messages can include vendor specific WCI2 messages, e.g. a message to notify the WiFi-BT wireless subsystem 1010 in advance of a cellular wireless subsystem 1010 transmission. The WiFi-BT wireless subsystem 1010, in some embodiments, can use the information provided by the message to delay reception of WiFi and/or BT signals by the WiFi-BT wireless subsystem 1010 to avoid simultaneous interference from the cellular transmissions emitted by the cellular wireless subsystem 1010. The cellular wireless subsystem 1010 can receive a message from the host processor 1002 to transition from the "wireless coexistence" state 1204 to the "no wireless coexistence" state 1202, and in response the cellular wireless subsystem 1010 can reconfigure link quality reporting to the host processor 1002. For example, while in the "wireless coexistence" state 1204, link quality measurement and reporting can occur more frequently than while in the "no wireless coexistence" state 1202.

FIG. 17 illustrates a table 1700 that summarizes actions that the cellular wireless subsystem 1010 can undertake based on one or more events when the WiFi-BT wireless subsystem 1010 is an "aggressor" and the cellular wireless subsystem 1010 is a "victim." The cellular wireless subsystem 1010 can provide radio frequency (RF) configuration updates to the host processor 1002. The RF configuration changes an include updates to a radio access technology (RAT) in use by the cellular wireless subsystem 1010, e.g., following in inter-RAT handover, changes to a set of radio frequencies in use, a TDD configuration, and/or other RF parameters that can affect RF transmission properties and therefore wireless RF interference into the collocated WiFI-BT wireless subsystem 1010. The cellular wireless subsystem 1010 can provide wireless configuration updates to the host processor 1002 whether in the "no wireless coexistence" state 1202 or the "wireless coexistence" state 1204. The host processor 1102 can send one or messages to the cellular wireless subsystem 1010 to enter the "wireless coexistence" state 1204. The cellular wireless subsystem 1010 can, in response, obtain one or more configuration parameters to use while in the "wireless coexistence" state 1204 from the host processor 1002. The cellular wireless subsystem 1010 can configure itself for monitoring and reporting of link quality metrics to the host processor 1002. The cellular wireless subsystem 1010 can calibrate a real-time communication interface that couples to the WiFi-BT wireless subsystem 1010, e.g., based on one or more calibration parameters (offset, jitter) provided by the host processor 1002. While in the "wireless coexistence" state 1204, the cellular wireless subsystem 1010 can receive requests from the host processor 1002 and/or from the WiFi-BT wireless subsystem 1010. Representative requests can include requests to delay reception of data, to adjust channel quality indicator (CQI) report values, and to start, stop and/or reconfigure link quality reporting. The cellular wireless subsystem 1010 and the WiFi-BT wireless subsystem 1010 can be interconnected by a real time communication interface, e.g., a WCI2 interface. In some embodiments, the WiFi-BT wireless subsystem 1010 can provide requests to the cellular wireless subsystem 1010, e.g., standard Type 0 Tx/Rx state messages and/or vendor specific messages that request delaying cellular reception to avoid interference. In some embodiments, the cellular wireless subsystem 1010 can send CQI reports indicating one or more reduced CQI values to a wireless access subsystem of a cellular wireless network to which it is connected and/or associated. Poor CQI reports can result in a lower probability of radio resources being allocated to the cellular wireless subsystem 1010, and therefore the cellular wireless subsystem 1010 can be less likely to receive data during a time period that overlaps with interfering WiFi-BT transmissions. By adjusting CQI reports, the cellular wireless subsystem 1010 can indirectly impact cellular downlink transmissions to the wireless communication device 402 to avoid reception during certain time periods, e.g., in response to information provided through the real time interface from the WiFi-BT wireless subsystem 1010. The cellular wireless subsystem 1010 can provide state change information to the host processor 1002 and/or to the WiFi-BT wireless subsystem 1010, e.g., based on certain activities undertaken, active procedures, and/or measurements of link quality by the cellular wireless subsystem 1010. In some embodiments, the cellular wireless subsystem 1010 can provide an indication of a critical activity, e.g., a cell search procedure, a random access channel (RACH) procedure, a radio resource control (RRC) procedure, or reception of a timing advance (TA) command, to the host processor 1002 and/or to the WiFi-BT wireless subsystem 1010. The cellular wireless subsystem 1010 can also provide information about cellular link quality, particularly if cellular link quality degrades, to the host processor 1002 and/or to the WiFi-BT wireless subsystem 1010. In some embodiments, the cellular subsystem 1010 can request that the WiFi-BT wireless subsystem limit transmit power and/or transmit time periods to provide for improvements in reception by the cellular wireless subsystem 1010. In some embodiments, the cellular wireless subsystem 1010 can request information about WiFi and/or BT transmission time periods, e.g., in order to schedule reception of cellular RF link signals during a "quiet" time period. In some embodiments, the cellular wireless subsystem 1010 requests advance notification of WiFi and/or BT transmissions from the WiFi-BT wireless subsystem. In response to a message from the host processor 1002 transitioning the cellular wireless subsystem 1010 from the "wireless coexistence" state 1204 to the "no wireless coexistence" state 1202, the cellular wireless subsystem 1010 can reconfigure link quality reporting, e.g., from periodic reporting to event based reporting.

FIG. 18 illustrates a table 1800 that summarizes actions that the WiFi-BT wireless subsystem 1010 can undertake based on one or more events when the WiFi-BT wireless subsystem is a "victim" and the cellular wireless subsystem is an "aggressor." The WiFi-BT wireless subsystem 1010 can provide configuration updates to the host processor 1002. The configuration updates can include changes to a set of radio frequency channels used by the WiFi-BT wireless subsystem 1010, a particular WiFi frequency channel, a WiFi operational mode, a BT operational mode (e.g., slave vs. master), and/or a BT profile change (e.g. synchronous vs. asynchronous communication modes). The WiFi-BT wireless subsystem 1010 can provide wireless configuration updates to the host processor 1002 whether in the "no wireless coexistence" state 1202 or the "wireless coexistence" state 1204. The host processor 1102 can send one or messages to the WiFi-BT wireless subsystem 1010 to enter the "wireless coexistence" state 1204. The WiFi-BT wireless subsystem 1010 can, in response, obtain one or more configuration parameters of the cellular wireless subsystem 1010 to inform decisions for actions undertaken while in the "wireless coexistence" state 1204 from the host processor 1002. The host processor 1002 can provide information on a cellular configuration, e.g., frequency band used, frequency channels used, channel bandwidths, time domain duplexing uplink and downlink settings, frame formats, etc. The WiFi-BT wireless subsystem 1010 can configure itself for monitoring and reporting of link quality metrics to the host processor 1002 while in the "wireless coexistence" state 1204. The WiFi-BT wireless subsystem 1010 can calibrate a real-time communication interface that couples to the cellular wireless subsystem 1010, e.g., based on one or more calibration parameters (offset, jitter) provided by the host processor 1002. The WiFi-BT wireless subsystem 1010 can obtain a BT AFH mask from the host processor 1002 to use while in the "wireless coexistence" state 1204. In some embodiments, the host processor 1002 can adjust the BT AFH mask 1002 based at least in part on a configuration of the cellular wireless subsystem 1010. While in the "wireless coexistence" state 1204, the WiFi-BT wireless subsystem 1010 can receive requests from the host processor 1002 and/or from the cellular wireless subsystem 1010. In some embodiments, the WiFi-BT wireless subsystem 1010 can conditionally act on the requests received from the host processor 1002 and/or from the cellular wireless subsystem 1010 based on an operational state and/or one or more operational activities performed by the WiFi-BT wireless subsystem 1010. For example, the WiFi-BT wireless subsystem can account for "critical" states and/or "critical" activities to ensure that changes to WiFi RF links and/or BT RF links can accommodate requested changes. Critical states and/or activities can include a BT transceiver in the WiFi-BT wireless subsystem 1010 engaging in a paging or inquiry operation, and a WiFi transceiver in the WiFi-BT wireless subsystem 1010 engaging in a scanning or association operation. The WiFi-BT wireless subsystem 1010 can delay or deny changes in wireless RF transmission properties during critical states and/or critical activities to ensure proper operation. In some embodiments, the WiFi-BT wireless subsystem 1010 can request "assistance" from the cellular wireless subsystem 1010 during critical states and/or critical activity time periods. Actions that the WiFi-BT wireless subsystem 1010 can undertake can include adjusting BT timing when feasible, e.g., aligning BT reception based on cellular transmissions to avoid BT reception during cellular transmit time periods. As a representative example, the WiFi-BT wireless subsystem 1010 can operate in accordance with a Bluetooth 4.1 wireless communication protocol, and the cellular wireless subsystem 1010 can operate in accordance with a Long Term Evolution (LTE) time-division duplexing (TDD) wireless protocol. In an embodiment, the WiFi-BT wireless subsystem 1010 can adjust BT timing, reconfigure a BT AFH mask, and/or schedule BT reception (e.g., for asynchronous links) based at least on information provided about the cellular wireless subsystem 1010 transmit and receive times. In an embodiment, the WiFi-BT wireless subsystem 1010 can adjust the BT AFH mask to avoid certain frequencies on which interference can occur. In an embodiment, the WiFi-BT wireless subsystem 1010 can provide an indication to a connected WiFi access point to schedule transmissions to the WiFi-BT wireless subsystem 1010 during particular time periods, e.g., by providing information to have the wireless access point transmit to the wireless communication device 402 during time periods when the cellular wireless subsystem 1010 is not transmitting. The WiFi-BT wireless subsystem 1010 can change a frequency channel on which the WiFi transceiver is using when operating in an access point or in a peer-to-peer mode. The frequency channel can be selected to have less interference from the cellular wireless subsystem 1010. The WiFi-BT wireless subsystem 1010 can also be requested by the host processor 1002 to calculate and report link quality metrics to the host processor 1002 while in the "wireless coexistence" state 1204. In some embodiments, the link quality metric reporting can be event based and/or periodic. The WiFi-BT wireless subsystem 1010 can provide activity and/or state information to the host processor 1002 and/or to the cellular wireless subsystem 1010. In some embodiments, the WiFi-BT wireless subsystem 1010 can request that the cellular wireless subsystem 1010 adjust transmission properties (e.g., transmit time periods, transmit frequencies, transmit power levels, etc.) in order to assist reception of signals and/or completion of procedures by the WiFi-BT wireless subsystem 1010, e.g., during critical BT or WiFi activities. The WiFi-BT wireless subsystem 1010 can receive a message from the host processor 1002 to transition from the "wireless coexistence" state 1204 to the "no wireless coexistence" state 1202, and in response the WiFi-BT wireless subsystem 1010 can reconfigure link quality reporting to the host processor 1002. For example, while in the "wireless coexistence" state 1204, link quality measurement and reporting can occur more frequently than while in the "no wireless coexistence" state 1202.

FIG. 19 illustrates a table 1900 that summarizes actions that the WiFi-BT wireless subsystem 1010 can undertake based on one or more events when the WiFi-BT wireless subsystem is an "aggressor" and the cellular wireless subsystem is a "victim." The WiFi-BT wireless subsystem 1010 can provide configuration updates to the host processor 1002. The configuration updates can include changes to a set of radio frequency channels used by the WiFi-BT wireless subsystem 1010, a particular WiFi frequency channel, a WiFi operational mode, a BT operational mode (e.g., slave vs. master), and/or a BT profile change (e.g. synchronous vs. asynchronous communication modes). The WiFi-BT wireless subsystem 1010 can provide wireless configuration updates to the host processor 1002 whether in the "no wireless coexistence" state 1202 or the "wireless coexistence" state 1204. The host processor 1102 can send one or messages to the WiFi-BT wireless subsystem 1010 to enter the "wireless coexistence" state 1204. The WiFi-BT wireless subsystem 1010 can, in response, obtain one or more configuration parameters of the cellular wireless subsystem 1010 to inform decisions for actions undertaken while in the "wireless coexistence" state 1204 from the host processor 1002. The host processor 1002 can provide information on a cellular configuration, e.g., frequency band used, frequency channels used, channel bandwidths, time domain duplexing uplink and downlink settings, frame formats, etc. The WiFi-BT wireless subsystem 1010 can configure itself for monitoring and reporting of link quality metrics to the host processor 1002 while in the "wireless coexistence" state 1204. The WiFi-BT wireless subsystem 1010 can calibrate a real-time communication interface that couples to the cellular wireless subsystem 1010, e.g., based on one or more calibration parameters (offset, jitter) provided by the host processor 1002. The WiFi-BT wireless subsystem 1010 can obtain a BT AFH mask from the host processor 1002 to use while in the "wireless coexistence" state 1204. In some embodiments, the host processor can adjust the BT AFH mask 1002 based at least in part on a configuration of the cellular wireless subsystem 1010. While in the "wireless coexistence" state 1204, the WiFi-BT wireless subsystem 1010 can receive requests from the host processor 1002 and/or from the cellular wireless subsystem 1010. In some embodiments, the WiFi-BT wireless subsystem 1010 can conditionally act on the requests received from the host processor 1002 and/or from the cellular wireless subsystem 1010 based on an operational state and/or one or more operational activities performed by the WiFi-BT wireless subsystem 1010. For example, the WiFi-BT wireless subsystem can account for "critical" states and/or "critical" activities to ensure that changes to WiFi RF links and/or BT RF links can accommodate requested changes. Critical states and/or activities can include a BT transceiver in the WiFi-BT wireless subsystem 1010 engaging in a paging or inquiry operation, and a WiFi transceiver in the WiFi-BT wireless subsystem 1010 engaging in a scanning or association operation. The WiFi-BT wireless subsystem 1010 can delay or deny changes in wireless RF transmission properties during critical states and/or critical activities to ensure proper operation. Actions that the WiFi-BT wireless subsystem 1010 can undertake can include adjusting BT timing when feasible, e.g., aligning BT transmission based on cellular reception to avoid BT transmission during cellular receive time periods. As a representative example, the WiFi-BT wireless subsystem 1010 can operate in accordance with a Bluetooth 4.1 wireless communication protocol, and the cellular wireless subsystem 1010 can operate in accordance with a Long Term Evolution (LTE) time-division duplexing (TDD) wireless protocol. In an embodiment, the WiFi-BT wireless subsystem 1010 can adjust BT timing, reconfigure a BT AFH mask, and/or schedule BT transmission (e.g., for asynchronous links) based at least in part on information provided about the cellular wireless subsystem 1010 transmit and receive times. In an embodiment, the WiFi-BT wireless subsystem 1010 can adjust the BT AFH mask to avoid certain frequencies on which interference can occur. The WiFi-BT wireless subsystem 1010 can change a frequency channel that the WiFi transceiver is using when operating in an access point or in a peer-to-peer mode. The frequency channel can be selected to have less interference for the cellular wireless subsystem 1010. The WiFi-BT wireless subsystem 1010 can deny BT transmissions when feasible (e.g., for synchronous links) during certain time periods, e.g., based at least in part on information provided about the cellular wireless subsystem 1010 transmit and receive times. The WiFi-BT wireless subsystem 1010 can delay WiFi transmissions, limit WiFi transmit power and/or limit BT transmit power when requested by the host processor 1002 and/or by the cellular wireless subsystem 1010. Changes to transmit power, however, can be conditioned on operational states, active procedures underway, and/or link quality to ensure minimal impact to existing WiFi and/or BT connections and/or associations. The WiFi-BT wireless subsystem 1010 can also be requested by the host processor 1002 to calculate and report link quality metrics to the host processor 1002 while in the "wireless coexistence" state 1204. In some embodiments, the link quality metric reporting can be event based and/or periodic. The WiFi-BT wireless subsystem 1010 can provide activity and/or state information to the host processor 1002 and/or to the cellular wireless subsystem 1010. The WiFi-BT wireless subsystem 1010 can provide WiFi-BT state and/or activity messages to the cellular wireless subsystem 1010, e.g., to inform the cellular wireless subsystem of transmission times and/or transmit properties of the WiFi and/or BT transceivers so that the cellular wireless subsystem 1010 can delay and/or reschedule reception of signals to time periods less likely to encounter interference. The WiFi-BT wireless subsystem 1010 can receive a message from the host processor 1002 to transition from the "wireless coexistence" state 1204 to the "no wireless coexistence" state 1202, and in response the WiFi-BT wireless subsystem 1010 can reconfigure link quality reporting to the host processor 1002. For example, while in the "wireless coexistence" state 1204, link quality measurement and reporting can occur more frequently than while in the "no wireless coexistence" state 1202.

Figure 20:
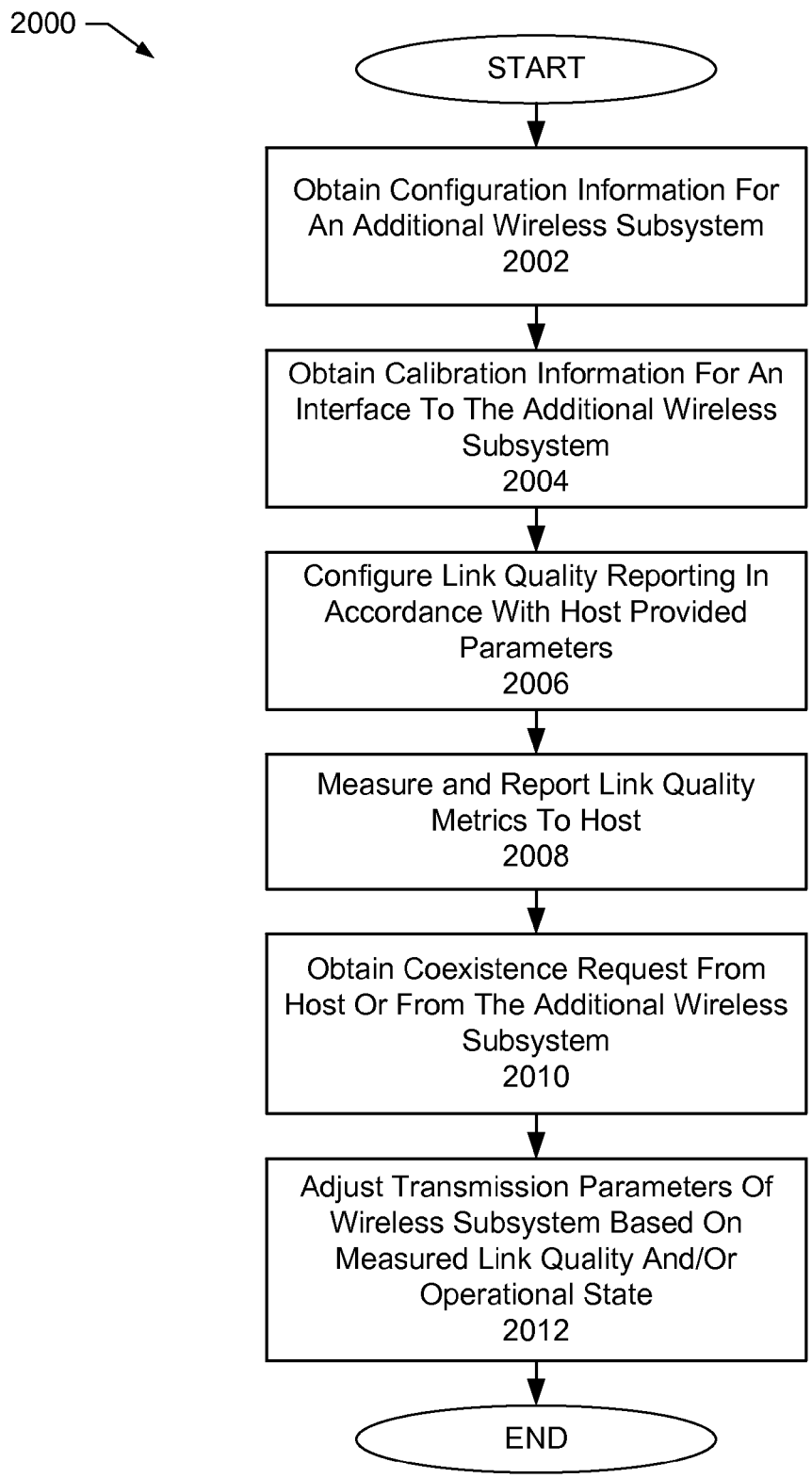
FIG. 20 illustrates a representative method that can be performed by components of the wireless communication device to mitigate interference of wireless radio frequency signals between multiple wireless subsystems of the wireless communication device, in accordance with some embodiments.

FIG. 20 illustrates a representative method 2000 to mitigate interference between wireless subsystems 1010 of a wireless communication device 402. The representative method 2000 can be performed by a wireless subsystem 1010 of the wireless communication device. The wireless subsystem 1010 can be coupled to a host processor 1002 and an additional wireless subsystem 1010 in the wireless communication device 402. In step 2002, the wireless subsystem 1010 can obtain configuration information from the host processor 1002 about a configuration of the additional wireless subsystem 1010 in the wireless communication device 402. In step 2004, the wireless subsystem 1010 can obtain calibration information from the host processor 1002 for an interface that couples the wireless subsystem 1010 to the additional wireless subsystem 1010 in the wireless communication device 402. In some embodiments, the interface is a real time interface. In some embodiments, the interface operates in accordance with a Bluetooth (BT) Wireless Communication Interface 2 (WCI2) communication protocol. In step 2006, the wireless subsystem 1010 configures link quality measurement reporting in accordance with parameters received from the host processor 1002. In step 2008, the wireless subsystem 1010 measures and reports link quality metrics for radio frequency communication received by the wireless subsystem 1010. In step 2010, the wireless subsystem 1010 obtains a coexistence request from the host processor 1002 or from the additional wireless subsystem 1010. In step 2012, the wireless subsystem 1010, in response to the coexistence request, adjusts one or more transmission parameters of the wireless subsystem 1010 to reduce interference of wireless radio frequency transmissions of the wireless subsystem 1010 into the additional wireless subsystem 1010. In some embodiments, the adjustment is based at least in part on the measured link quality for radio frequency communications received by the wireless subsystem and/or based on the operational state of the wireless subsystem.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling a wireless communication device or a wireless network entity. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A wireless communication device comprising:
a processor;
a first wireless subsystem coupled to the processor; and
a second wireless subsystem coupled to the processor and to the first wireless subsystem wherein the processor is configured to:
obtain a first wireless subsystem configuration and a second wireless subsystem configuration for the first wireless subsystem and the second wireless subsystem respectively;
evaluate whether the first and second wireless subsystem configurations indicate potential or actual coexistence interference between the first and second wireless subsystems; and
when the first and second wireless subsystem configurations indicate potential or actual coexistence interference between the first and second wireless subsystems:
provide information of the first wireless subsystem configuration to the second wireless subsystem;
provide information of the second wireless subsystem configuration to the first wireless subsystem;
provide link quality reporting parameters to the first and second wireless subsystems;
obtain link quality reports from the first and second wireless subsystems; and
when a link quality of the second wireless subsystem fails a set of link quality conditions, adjust data requirements for one or more applications that generate or consume data packets communicated using the first wireless subsystem.

2. The wireless communication device of claim 1, wherein the second wireless subsystem is configured to provide state information for the second wireless subsystem to the first wireless subsystem via an interface between the first and second wireless subsystems; and
a first coexistence management controller of the first wireless subsystem is configured to use the state information to control operation of the first wireless subsystem to mitigate interference with the second wireless subsystem.

3. The wireless communication device of claim 1, wherein the first wireless subsystem operates in accordance with a wireless cellular communication protocol, and the second wireless subsystem operates in accordance with one or more of: a wireless local area network protocol and a wireless personal area network protocol.

4. The wireless communication device of claim 1, wherein, when the link quality of the second wireless subsystem fails the set of link quality conditions, the processor is further configured to:
provide a request to the first wireless subsystem to adjust a transmit power level to mitigate interference with the second wireless subsystem.

5. The wireless communication device of claim 4, wherein:
when the first wireless subsystem adjusts the transmit power level in response to the request, the processor is further configured to configure the first wireless subsystem to measure and report link quality to the processor periodically; and
when the first wireless subsystem does not adjust the transmit power level in response to the request, the processor is further configured to provide a second request to the first wireless subsystem to reduce the transmit data rate of the first wireless subsystem.

6. The wireless communication device of claim 1, wherein the processor is further configured to provide calibration information for a communication interface between the first and second wireless subsystems to the first and second wireless subsystems, wherein the calibration information comprises one or more of an offset and a jitter setting.

7. The wireless communication device of claim 1, wherein the processor is configured to adjust the data requirements for the one or more applications by reducing a real-time codec rate or by reducing a streaming transfer rate for at least one application in the one or more applications.

8. The wireless communication device of claim 3, wherein first wireless subsystem configuration comprises one or more of a frequency band, a frequency channel, and a frequency bandwidth, and wherein the second wireless subsystem configuration comprises an uplink and downlink time-division duplexing configuration.

9. The wireless communication device of claim 4, wherein the first wireless subsystem, in response to the request to adjust the transmit power level, conditionally adjusts the transmit power level based on a link state of the first wireless subsystem, wherein the link state comprises one or more of: a link quality, a number of active radio bearers, and a set of active procedures for communication through the first wireless subsystem.

10. A method to facilitate coexistence of a plurality of interconnected wireless subsystems in a wireless communication device that includes a processor, a first wireless subsystem, and a second wireless subsystem, the method comprising:

at the processor:
evaluating whether a first wireless subsystem configuration and a second wireless subsystem configuration indicates potential or actual coexistence interference between the first wireless subsystem and the second wireless subsystem;
when the first and second wireless subsystem configurations indicate potential or actual coexistence interference between the first and second wireless subsystems:
providing link quality reporting parameters to the first and second wireless subsystems;
obtaining link quality reports for the first and second wireless subsystems; and
when a link quality of the second wireless subsystem fails a set of link quality conditions, providing a request to the first wireless subsystem to adjust one or more settings of the first wireless subsystem configuration to mitigate interference with the second wireless subsystem.

11. The method of claim 10, wherein the one or more settings of the first wireless subsystem configuration comprise one or more of: a transmit power level, a transmit data rate, a period of time of transmission, and a transmit frequency, to reduce interference of wireless radio frequency transmissions of the first wireless subsystem into the second wireless subsystem.

12. The method of claim 10, wherein first wireless subsystem operates in accordance with a wireless cellular communication protocol, and the second wireless subsystem operates in accordance with one or more of: a wireless local area network protocol and a wireless personal area network protocol.

13. The method of claim 10, further comprising the processor in the wireless communication device adjusting data requirements for one or more applications that generate or consume data packets communicated through the first wireless subsystem.

14. The method of claim 10, further comprising the processor in the wireless communication device adjusting data requirements for one or more applications that generate or consume data packets communicated through the second wireless subsystem.

15. The method of claim 10, wherein providing the request to the first wireless subsystem to adjust the one or more settings of the first wireless subsystem configuration comprises providing a request to the first wireless subsystem to reduce a transmit power level of the first wireless subsystem; and further comprising:

at the processor:
reducing data rate requirements for one or more applications that receive data packets communicated through the second wireless subsystem, when the first wireless subsystem does not reduce the transmit power level in response to the request.

16. The method of claim 10, wherein the first wireless subsystem operates in accordance with a wireless personal area network protocol, and wherein the request to the first wireless subsystem to adjust one or more settings of the first wireless subsystem configuration comprises using an adjusted adaptive frequency hopping mask based at least in part on the second wireless subsystem configuration.

17. The method of claim 10, wherein the first wireless subsystem operates in accordance with a wireless local area network protocol, and wherein the request to the first wireless subsystem to adjust one or more settings of the first wireless subsystem configuration comprises changing a frequency channel used for transmissions by the first wireless subsystem when the first wireless subsystem operates in a peer-to-peer mode or in an access point mode.

18. The method of claim 10, wherein the first wireless subsystem operates in accordance with a wireless personal area network protocol and the second wireless subsystem operates in accordance with a wireless cellular protocol in a time-division mode, and wherein the request to the first wireless subsystem to adjust one or more settings of the first wireless subsystem configuration comprises aligning a transmission timing of the first wireless subsystem with respect to a reception timing of the time-division mode of the second wireless subsystem.

19. The method of claim 10, further comprising the processor in the wireless communication device adjusting data requirements for one or more applications by reducing a real-time codec rate or reducing a streaming transfer rate for at least one application of the one or more applications.

20. A method to facilitate coexistence of a plurality of interconnected wireless subsystems in a wireless communication device, the method comprising:

at a first wireless subsystem in the plurality of interconnected wireless subsystems:
obtaining information of a configuration of a second wireless subsystem in the plurality of interconnected wireless subsystems;
obtaining calibration information for a communication interface between the first and second wireless subsystems;
configuring link quality reporting in accordance with parameters provided by a host processor in the wireless communication device;
measuring link quality for radio frequency communications received by the first wireless subsystem;
reporting link quality measurements to the host processor;
obtaining a coexistence request from the host processor or from the second wireless subsystem; and
in response to the coexistence request, adjusting one or more transmission parameters of the first wireless subsystem, the adjusting based at least in part on one or more of the measured link quality for radio frequency communications received by the first wireless subsystem and an operational state of the first wireless subsystem.

* * * * *